United States Patent
Horiuchi

(10) Patent No.: US 6,392,817 B1
(45) Date of Patent: May 21, 2002

(54) REAR FOCUS TYPE ZOOM LENS AND OPTICAL APPARATUS USING THE SAME

(75) Inventor: Akihisa Horiuchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/625,850

(22) Filed: Jul. 26, 2000

(30) Foreign Application Priority Data

Jul. 26, 1999 (JP) .......................... 11-210214

(51) Int. Cl.$^7$ .......................... G02B 15/14; G02B 13/02
(52) U.S. Cl. .................. 359/687; 359/686; 359/745; 359/747
(58) Field of Search ................. 359/686, 687, 359/745, 747

(56) References Cited

U.S. PATENT DOCUMENTS

| | | | |
|---|---|---|---|
| 4,299,454 A | 11/1981 | Betensky | 350/427 |
| 4,776,679 A | 10/1988 | Kitagishi et al. | 350/427 |
| 4,802,747 A | 2/1989 | Horiuchi | 350/427 |
| 4,810,070 A | 3/1989 | Suda et al. | 350/413 |
| 4,842,386 A | 6/1989 | Kitagishi et al. | 350/427 |
| 4,854,684 A | 8/1989 | Horiuchi | 350/427 |
| 4,892,397 A | 1/1990 | Horiuchi | 350/425 |
| 4,907,866 A | 3/1990 | Kitagishi et al. | 350/426 |

(List continued on next page.)

FOREIGN PATENT DOCUMENTS

| | | |
|---|---|---|
| JP | 62-24213 | 2/1987 |
| JP | 62-178917 | 8/1987 |
| JP | 62-206516 | 9/1987 |
| JP | 62-247316 | 10/1987 |
| JP | 63-29718 | 2/1988 |
| JP | 64-68709 | 3/1989 |
| JP | 2-53017 | 2/1990 |
| JP | 4-43311 | 2/1992 |
| JP | 4-78807 | 3/1992 |
| JP | 5-60972 | 3/1993 |
| JP | 5-72474 | 3/1993 |
| JP | 6-347697 | 12/1994 |
| JP | 7-113955 | 5/1995 |
| JP | 7-199069 | 8/1995 |
| JP | 7-261081 | 10/1995 |
| JP | 8-5916 | 1/1996 |
| JP | 8-5917 | 1/1996 |
| JP | 8-179206 | 7/1996 |
| JP | 8-292369 | 11/1996 |
| JP | 9-211324 | 8/1997 |
| JP | 11-84238 | 3/1999 |

*Primary Examiner*—Georgia Epps
*Assistant Examiner*—Michael A. Lucas
(74) *Attorney, Agent, or Firm*—Fitzpatrick, Cella, Harper & Scinto

(57) ABSTRACT

A rear focus type zoom lens has, in succession from the object side, a first lens unit L1 of positive refractive power, a second lens unit L2 of negative refractive power, a third lens unit L3 of positive refractive power and a fourth lens unit L4 of positive refractive power. The second lens unit is moved toward the image plane side to effect a focal length change from the wide angle end to the telephoto end. The fourth lens unit is moved to correct the fluctuation of the image plane resulting from a focal length change and the fourth lens unit is moved to effect focusing. The third lens unit has a stop most adjacent to the image plane side. The surface thereof adjacent to the stop is convex toward the image plane side and aspherical. When the focal lengths of the entire system at the wide angle end and the telephoto end are defined as fw and ft, respectively, and the F number of the wide angle end is defined as FNW, and the focal length of the second lens unit is defined as f2, the following conditional expression is satisfied:

$$0.8 < \{|f2/fA|\} \times FNW < 1.6$$

$$(fA = \sqrt{fw \cdot ft}).$$

107 Claims, 13 Drawing Sheets

U.S. PATENT DOCUMENTS

| | | | |
|---|---|---|---|
| 4,934,796 A | 6/1990 | Sugiura et al. | 350/427 |
| 4,988,174 A | 1/1991 | Horiuchi et al. | 350/427 |
| 5,011,272 A | 4/1991 | Nakayama et al. | 350/427 |
| 5,050,972 A | 9/1991 | Mukaiya et al. | 359/683 |
| 5,056,900 A | 10/1991 | Mukaiya et al. | 359/676 |
| 5,095,387 A | 3/1992 | Horiuchi | 359/676 |
| 5,138,492 A | 8/1992 | Hamano et al. | 359/684 |
| 5,189,558 A | 2/1993 | Ishii et al. | 359/687 |
| 5,225,937 A | 7/1993 | Horiuchi | 359/688 |
| 5,235,466 A | 8/1993 | Ono et al. | 359/684 |
| 5,321,552 A | 6/1994 | Horiuchi et al. | 359/654 |
| 5,353,157 A | 10/1994 | Horiuchi | 359/676 |
| 5,583,698 A | 12/1996 | Yamada et al. | 359/687 |
| 5,612,825 A | 3/1997 | Horiuchi et al. | 359/687 |
| 5,638,216 A | 6/1997 | Horiuchi et al. | 359/683 |
| 5,644,433 A * | 7/1997 | Ikari | 359/687 |
| 5,739,961 A | 4/1998 | Nakayama et al. | 359/687 |
| 5,754,346 A | 5/1998 | Nakayama et al. | 359/687 |
| 5,940,221 A | 8/1999 | Okayama et al. | 359/687 |
| 6,081,389 A | 6/2000 | Takayama et al. | 359/680 |
| 6,084,722 A | 7/2000 | Horiuchi | 359/687 |
| 6,166,864 A * | 12/2000 | Horiuchi | 359/687 |
| 6,226,130 B1 * | 5/2001 | Mukaiya | 359/687 |

\* cited by examiner

REAR FOCUS TYPE ZOOM LENS AND OPTICAL APPARATUS USING THE SAME

BACKGROUND OF THE INVENTION

1. Field of the Invention

This invention relates to a rear focus type zoom lens, and particularly to a compact rear focus type zoom lens suitable for use in a video still camera or the like, in which the zoom ratio has a high variable power ratio, and yet the number of constituent lenses is small, the aperture ratio is great and the mechanism is simple.

2. Related Background Art

In zoom lenses used in photographic cameras, video cameras, etc., there have heretofore been various examples adopting the so-called rear-focus-type system in which lens units rearward of the first lens unit on the object side are moved to effect focusing. This is because the rear-focus-type system moves relatively compact and light-weight lens units, and therefore, the driving force for the lens units may be small and quick focusing is possible, and therefore the rear-focus-type system is compatible with an auto-focus system.

For example, in Japanese Patent Application Laid-Open Nos. 62-206516, 62-24213, 62-247316 and 4-43311, the zoom lens has four lens units in succession from the object side, i.e., a first lens unit of positive refractive power, a second lens unit of negative refractive power, a third lens unit of positive refractive power and a fourth lens unit of positive refractive power, and the second lens unit is moved to effect a focal length change, and the fourth lens unit is moved to correct the fluctuation of the image plane resulting from the focal length change and also to effect focusing.

Japanese Patent Application Laid-Open No. 63-29718 discloses a zoom lens comprising, in succession from the object side, a first lens unit of positive refractive power, a second lens unit comprised of three lenses, i.e., a negative lens, a negative lens and a positive lens, having negative refractive power as a whole, movable during a focal length change and governing chiefly the focal length change, a third lens unit having positive refractive power and including an aspherical surface, and a fourth lens unit having positive refractive power with a somewhat great air space with respect to the third lens unit and correcting the fluctuation of the image plane resulting from the focal length change and movable for focusing.

Japanese Patent Application Laid-Open No. 5-72474 discloses an aspherical zoom lens having, in succession from the object side, a fixed first lens unit having positive refractive power, a second lens unit for focal length change having negative refractive power, a fixed third lens unit of positive refractive power having a condensing action, and a fourth lens unit of positive refractive power movable on an optical axis to maintain the position of the image plane. In this zoom lens, the second lens unit comprises a meniscus negative lens, a biconcave lens and a positive lens, the third lens unit is comprised of a single lens having one or more aspherical surfaces, and the fourth lens unit is comprised of a lens having one or more aspherical surfaces.

U.S. Pat. No. 4,299,454 discloses a zoom lens comprising, in succession from the object side, a first positive lens unit, a second negative lens unit, and a rearward positive lens unit, at least two lens units including the negative lens unit being moved to effect a focal length changes, the second negative lens unit comprising, in succession from the object side, first and second negative lenses and a positive doublet.

In the so-called four-unit rear focus zoom lens, there is a method of strengthening the refractive power of the second lens unit for focal length change and reducing the amount of movement of the second lens unit for securing a predetermined variable power ratio in the direction of the optical axis thereof.

When the construction as described above is adopted, the spacing between the first lens unit and the second lens unit, which are a focal length changing system, becomes short, and the distance from a stop to the first lens unit becomes short and therefore, the diameter of the fore lens becomes small. As a result, it becomes possible to make the thickness of the first lens unit small and therefore, the downsizing of the entire lens system becomes easy.

As a downsizing method, there is a method of decreasing the number of lenses. Specifically, there is a method of constructing the third lens unit of a lens and constructing the fourth lens unit of three or less lenses to achieve downsizing.

Zoom lenses of such construction have been proposed, for example, in Japanese Patent Application Laid-Open Nos. 62-178917, 64-68709, 2-53017, 4-78807, 5-60972, 5-72474, 6-347697, 7-113955, 7-199069, 7-261081, 8-5916, 8-5917, 8-179206, 8-292369, 9-211324, 11-84238, etc.

SUMMARY OF THE INVENTION

It is an object of the present invention to provide a rear focus type zoom lens which enables the downsizing of the entire lens system, quick focusing and the simplification of a mechanical mechanism to be achieved and in which the zoom ratio is a high variable power ratio and yet the number of constituent lenses can be reduced under a great aperture ratio and which can be suitably used particularly in a video still camera or the like.

It is another object of the present invention to provide a rear focus type zoom lens having, in succession from the object side, a first lens unit of positive refractive power, a second lens unit of negative refractive power, a third lens unit of positive refractive power and a fourth lens unit of positive refractive power, wherein the third lens unit has a stop most adjacent to the image plane side, the surface thereof adjacent to the stop is convex toward the image plane side and aspherical, and when the focal lengths of the entire system at the wide angle end and the telephoto end are defined as fw and ft, respectively, and the F number of the wide angle end is defined as FNW, and the focal length of the second lens unit is defined as f2, the following conditional expression is satisfied:

$$0.8 < \{|f2/fA|\} \times FNW < 1.6$$

$$(fA = \sqrt{fw \cdot ft})$$

It is another object of the present invention to provide an optical apparatus having the afore-described rear focus type zoom lens.

It is another object of the present invention to provide a rear focus type zoom lens having, in succession from the object side, a first lens unit of positive refractive power, a second lens unit of negative refractive power, a third lens unit of positive refractive power and a fourth lens unit of positive refractive power, wherein the third lens unit has a stop most adjacent to the image plane side, the surface thereof adjacent to the stop is convex toward the image plane side and aspherical, that surface of the fourth lens unit which is most adjacent to the object side is concave toward the object side, and when the radius of curvature of that surface of the fourth lens unit which is most adjacent to the object side is defined as R4F, and the focal length of the fourth lens unit is defined as f4, the following conditional expression is satisfied:

$$0.8 < |R4F/f4| < 1.8$$

It is another object of the present invention to provide an optical apparatus having the above-described rear focus type zoom lens.

It is another object of the present invention to provide a rear focus type zoom lens having, in succession from the object side, a first lens unit of positive refractive power, a second lens unit of negative refractive power, a third lens unit of positive refractive power and a fourth lens unit of positive refractive power, wherein the third lens unit has a stop most adjacent to the image plane side, the surface thereof adjacent to the stop is convex toward the image plane side and aspherical, and when the radius of curvature of that surface of the second lens unit which is most adjacent to the object side is defined as R2F and the focal length of the second lens unit is defined as f2, the following conditional expression is satisfied;

$$11 < |R2F/f2| < 84$$

It is another object of the present invention to provide an optical apparatus having the above-described rear focus type zoom lens.

It is another object of the present invention to provide a rear focus type zoom lens having, in succession from the object side, a first lens unit of positive refractive power, a second lens unit of negative refractive power, a third lens unit of positive refractive power and a fourth lens unit of positive refractive power, wherein the third lens unit has a stop most adjacent to the image plane side, the surface thereof adjacent to the stop is convex toward the image plane side and aspherical, and when the refractive index of the medium of the negative lens of the second lens unit which is most adjacent to the object side is defined as N2f, the following conditional expression is satisfied:

$$1.83 < N2f < 1.91$$

It is another object of the present invention to provide an optical apparatus having the above-described rear focus type zoom lens.

It is another object of the present invention to provide a rear focus type zoom lens having, in succession from the object side, a first lens unit of positive refractive power, a second lens unit of negative refractive power, a third lens unit of positive refractive power and a fourth lens unit of positive refractive power, wherein the third lens unit has a stop most adjacent to the image plane side, the surface thereof adjacent to the stop is convex toward the image plane side and aspherical, and the following conditional expression is satisfied:

$$0.05 < (D3w - D3T)/fA < 0.14,$$

where D3w represents the distance between the third lens unit and the fourth lens unit when focusing on an infinity object upon the wide angle end and D3T represents the distance between the third lens unit and the fourth lens unit when focusing on an infinity object upon the telephoto end.

It is another object of the present invention to provide an optical apparatus having the above-described rear focus type zoom lens.

It is another object of the present invention to provide a rear focus type zoom lens having, in succession from the object side, a first lens unit of positive refractive power, a second lens unit of negative refractive power, a third lens unit of positive refractive power and a fourth lens unit of positive refractive power, the second lens unit being moved to the image plane side during the focal length change from the wide angle end to the telephoto end, the fourth lens unit being moved when the correction of the fluctuation of the image plane resulting from the focal length change is to be effected, wherein the third lens unit has a stop most adjacent to the image plane side, the surface thereof adjacent to the stop is convex toward the image plane side and aspherical, and when the refractive index of the medium of the positive lens of the first lens unit which is most adjacent to the image plane is defined as N1r, the following conditional expression is satisfied:

$$1.75 < N1r < 1.91$$

It is another object of the present invention to provide an optical apparatus having the above-described rear focus type zoom lens.

Other objects and features of the present invention will become apparent from the following detailed description of the invention taken in conjunction with the accompanying drawings.

DESCRIPTION OF THE PREFERRED EMBODIMENTS

Some embodiments of the present invention will hereinafter be described with reference to the drawings.

Figure 1:
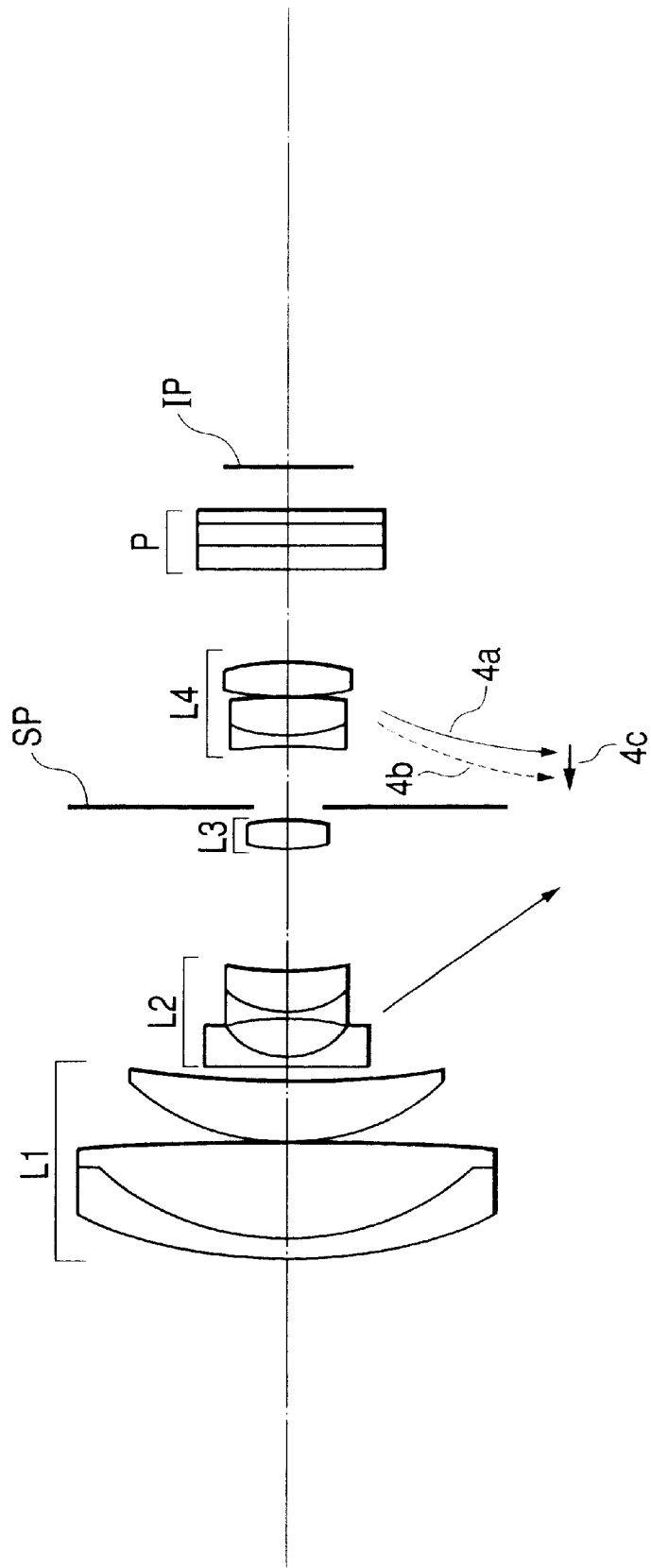
FIG. 1 is a cross-sectional view of a rear focus type zoom lens according to Embodiment 1 of the present invention at the wide angle end thereof.
Figure 5:
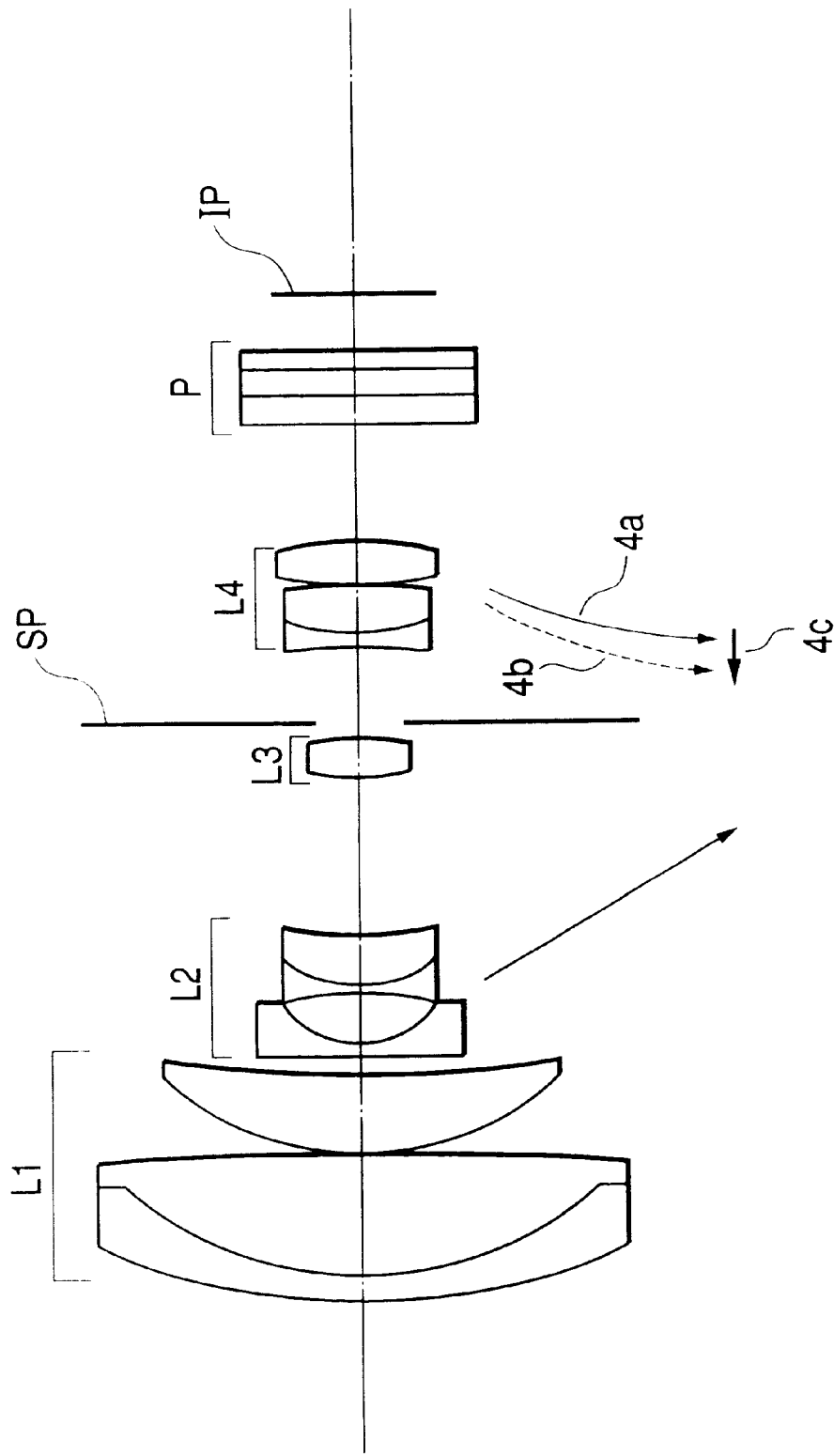
FIG. 5 is a cross-sectional view of a rear focus type zoom lens according to Embodiment 2 of the present invention at the wide angle end thereof.
Figure 9:
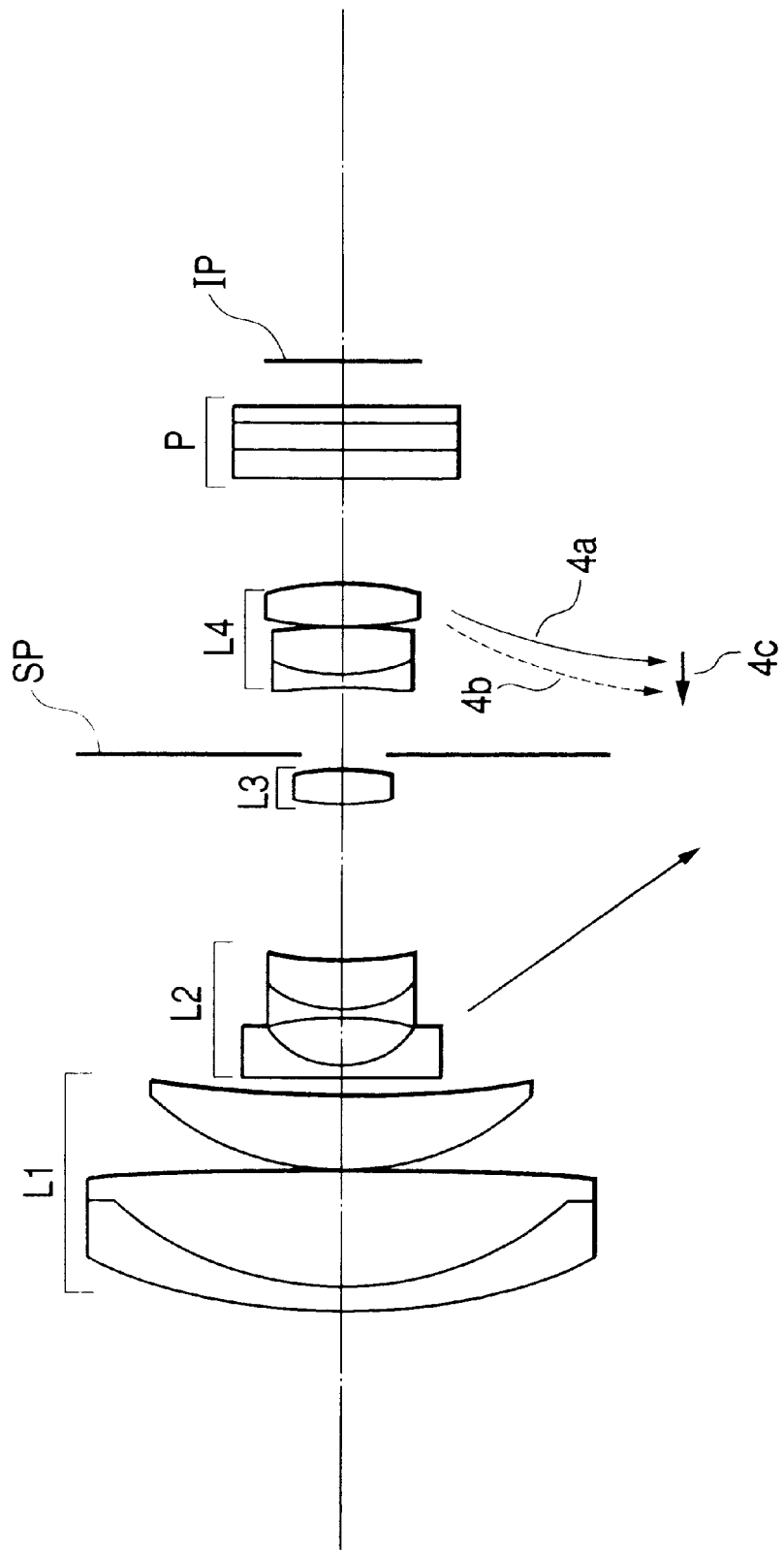
FIG. 9 is a cross-sectional view of a rear focus type zoom lens according to Embodiment 3 of the present invention at the wide angle end thereof.

FIGS. 1, 5 and 9 are cross-sectional views of rear focus type zoom lenses according to Embodiments 1, 2 and 3, respectively, of the present invention at the wide angle ends thereof.

Embodiment 1 shown in FIG. 1 is based on Numerical Value Embodiment 1 which will be described later, Embodiment 2 shown in FIG. 5 is based on Numerical Value Embodiment 2 which will be described later, and Embodiment 3 shown in FIG. 9 is based on Numerical Value Embodiment 3 which will be described later.

Figure 2:
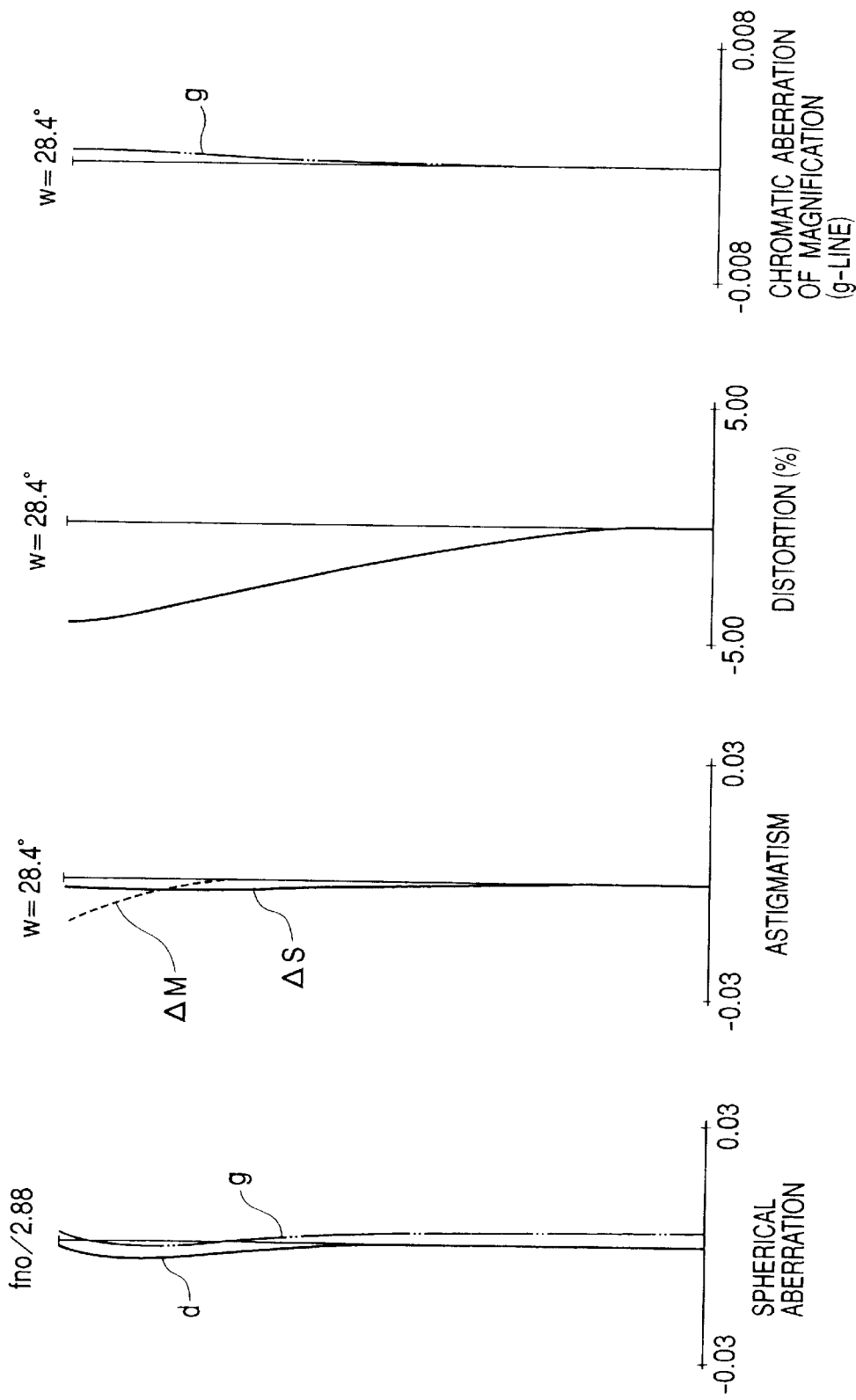
FIG. 2 shows the aberrations of Embodiment 1 at the wide angle end thereof.
Figure 3:
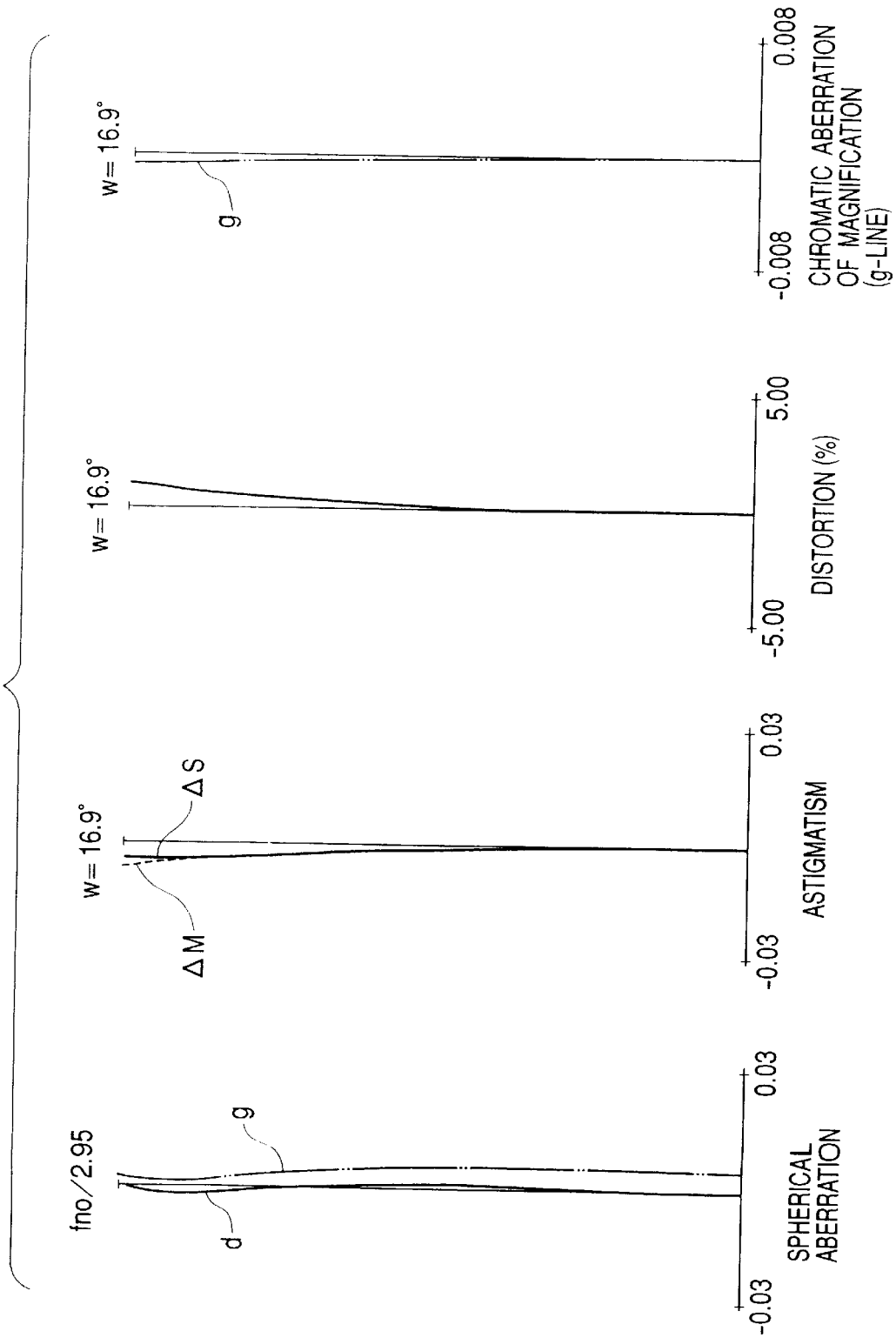
FIG. 3 shows the aberrations of Embodiment 1 at the middle thereof.
Figure 4:
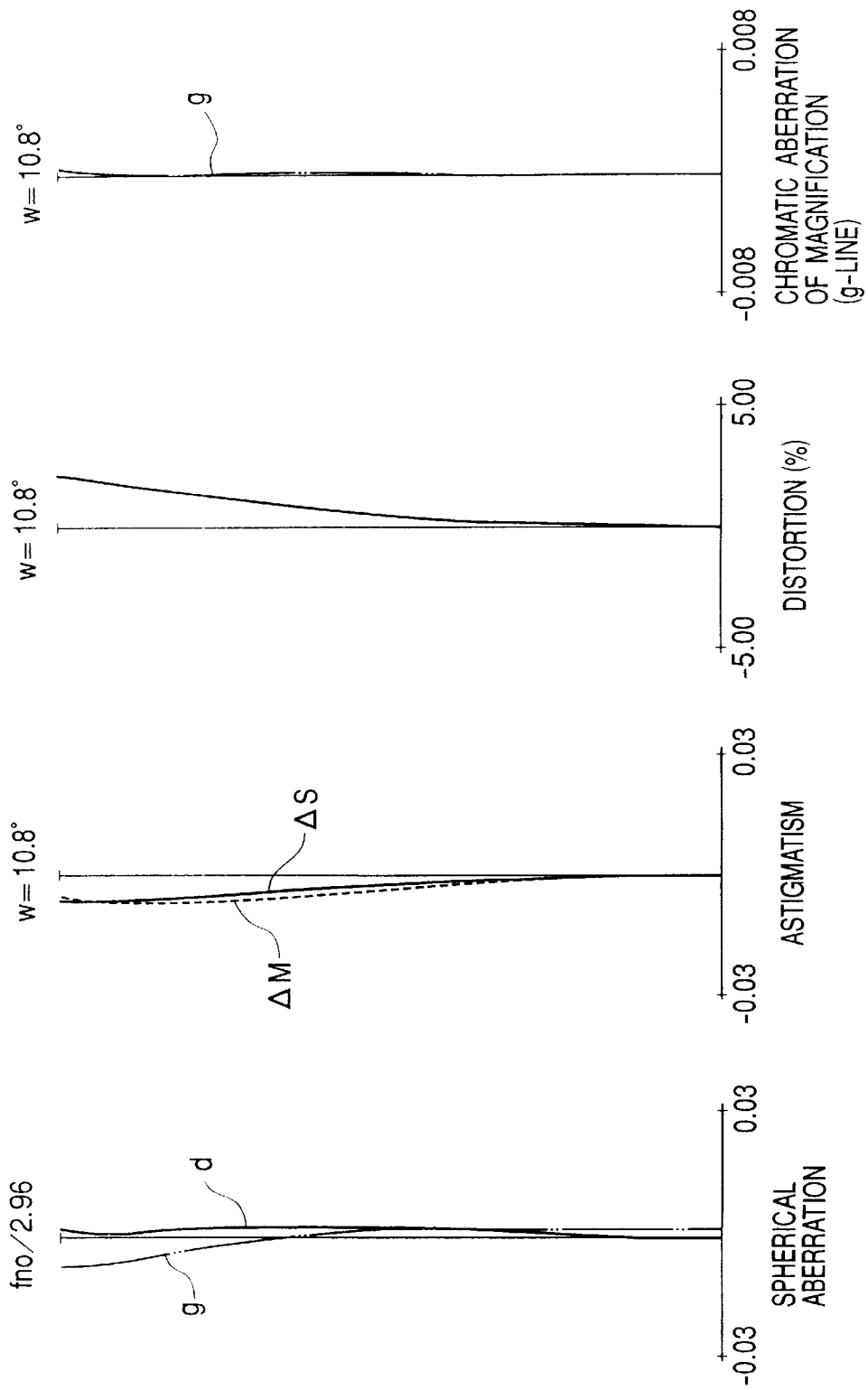
FIG. 4 shows the aberrations of Embodiment 1 at the telephoto end thereof.

Also, FIGS. 2 to 4 show the aberrations of Embodiment 1 at the wide angle end, the middle and the telephoto end, respectively, thereof.

Figure 6:
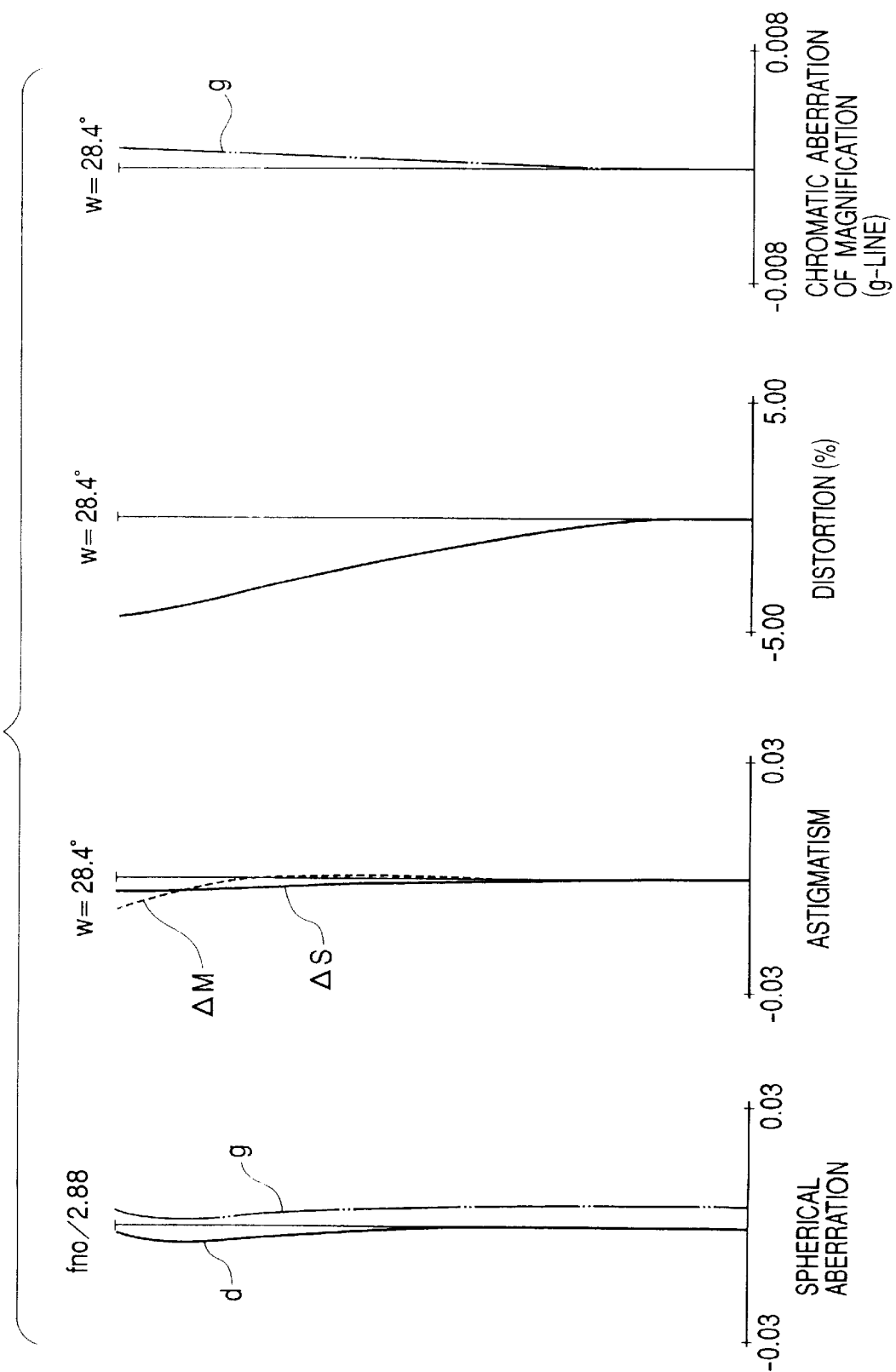
FIG. 6 shows the aberrations of Embodiment 2 at the wide angle end thereof.
Figure 7:
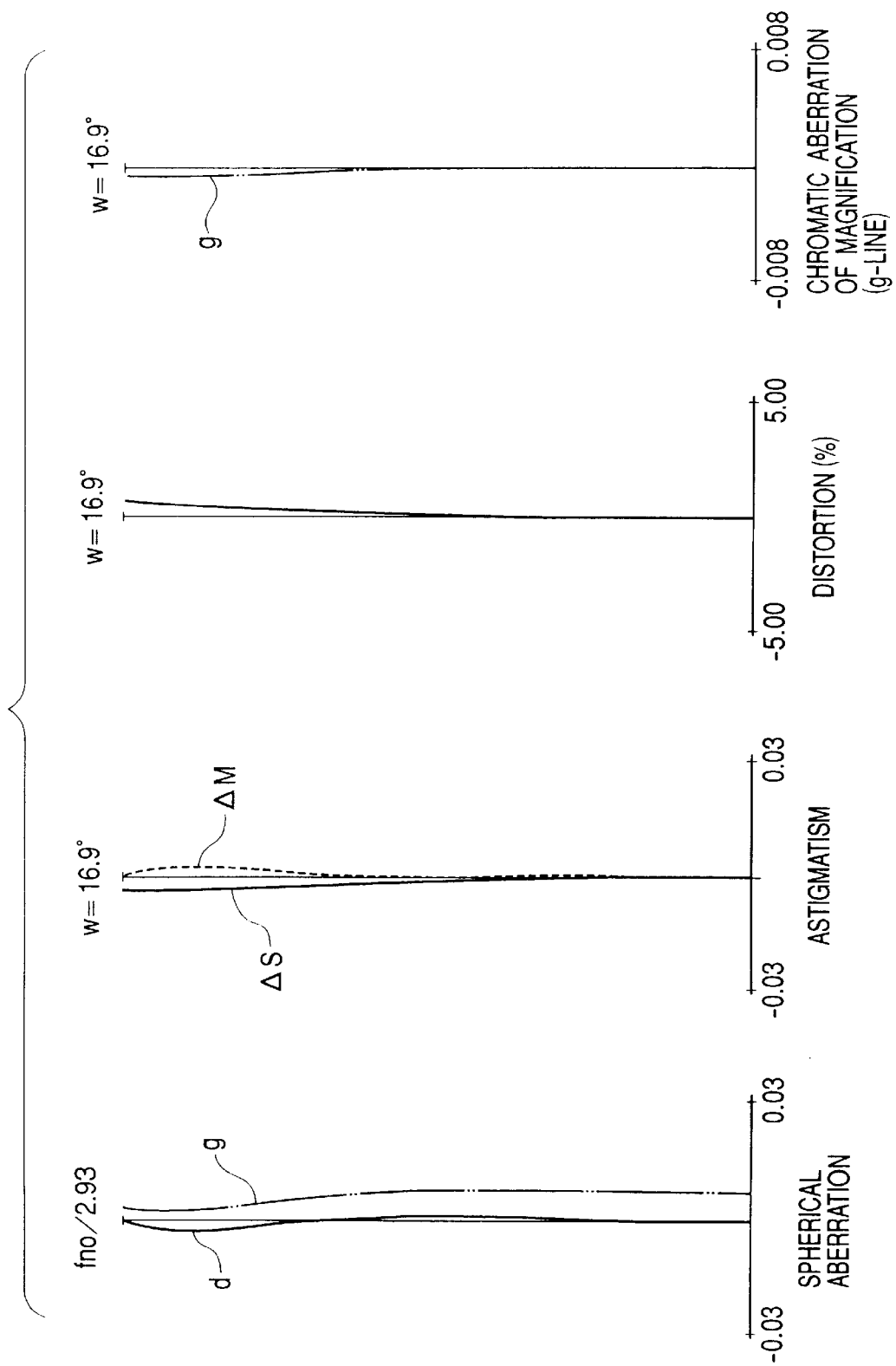
FIG. 7 shows the aberrations of Embodiment 2 at the middle thereof.
Figure 8:
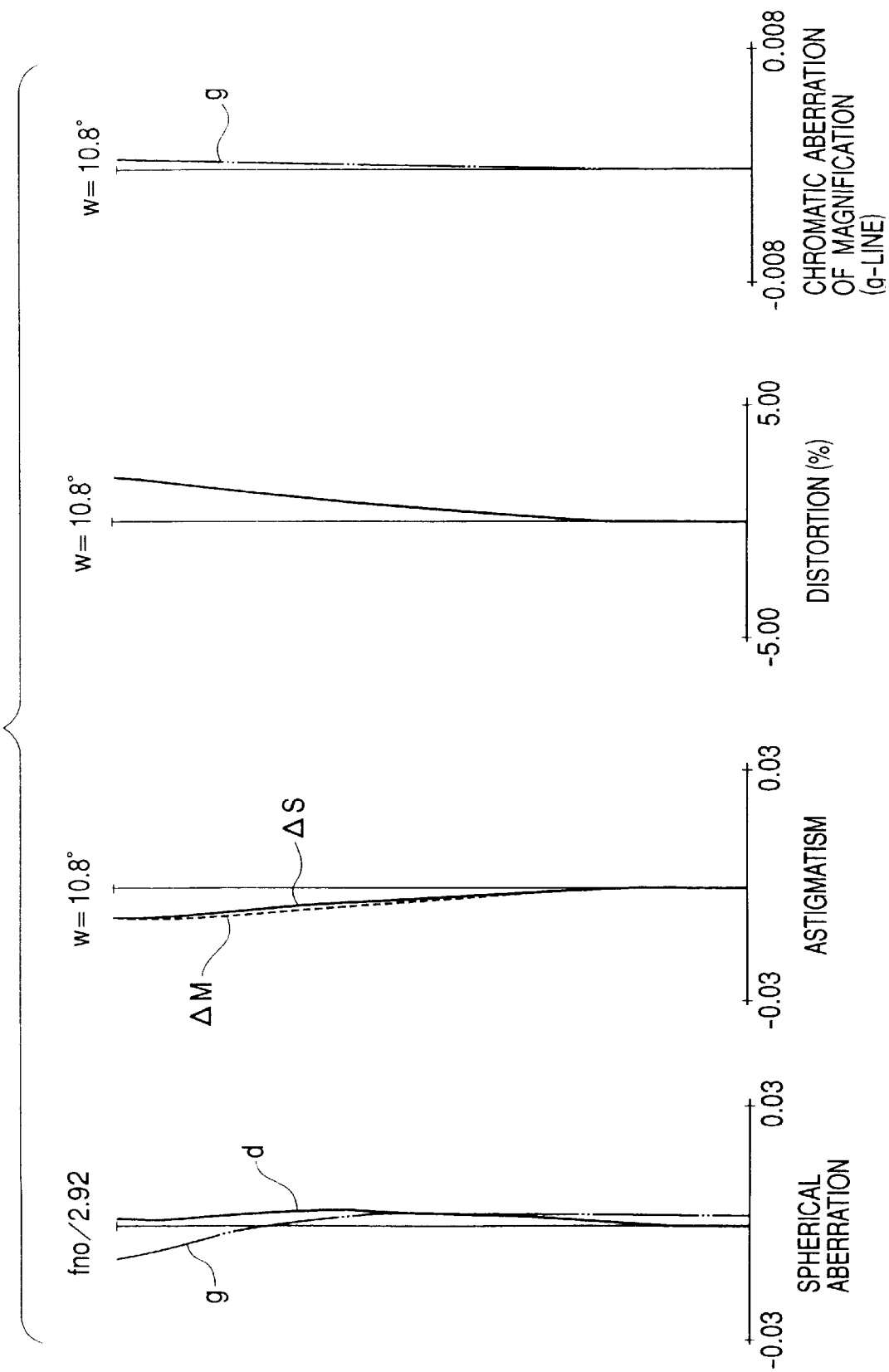
FIG. 8 shows the aberrations of Embodiment 2 at the telephoto end thereof.

Also, FIGS. 6 to 8 show the aberrations of Embodiment 2 at the wide angle end, the middle and the telephoto end, respectively, thereof.

Figure 10:
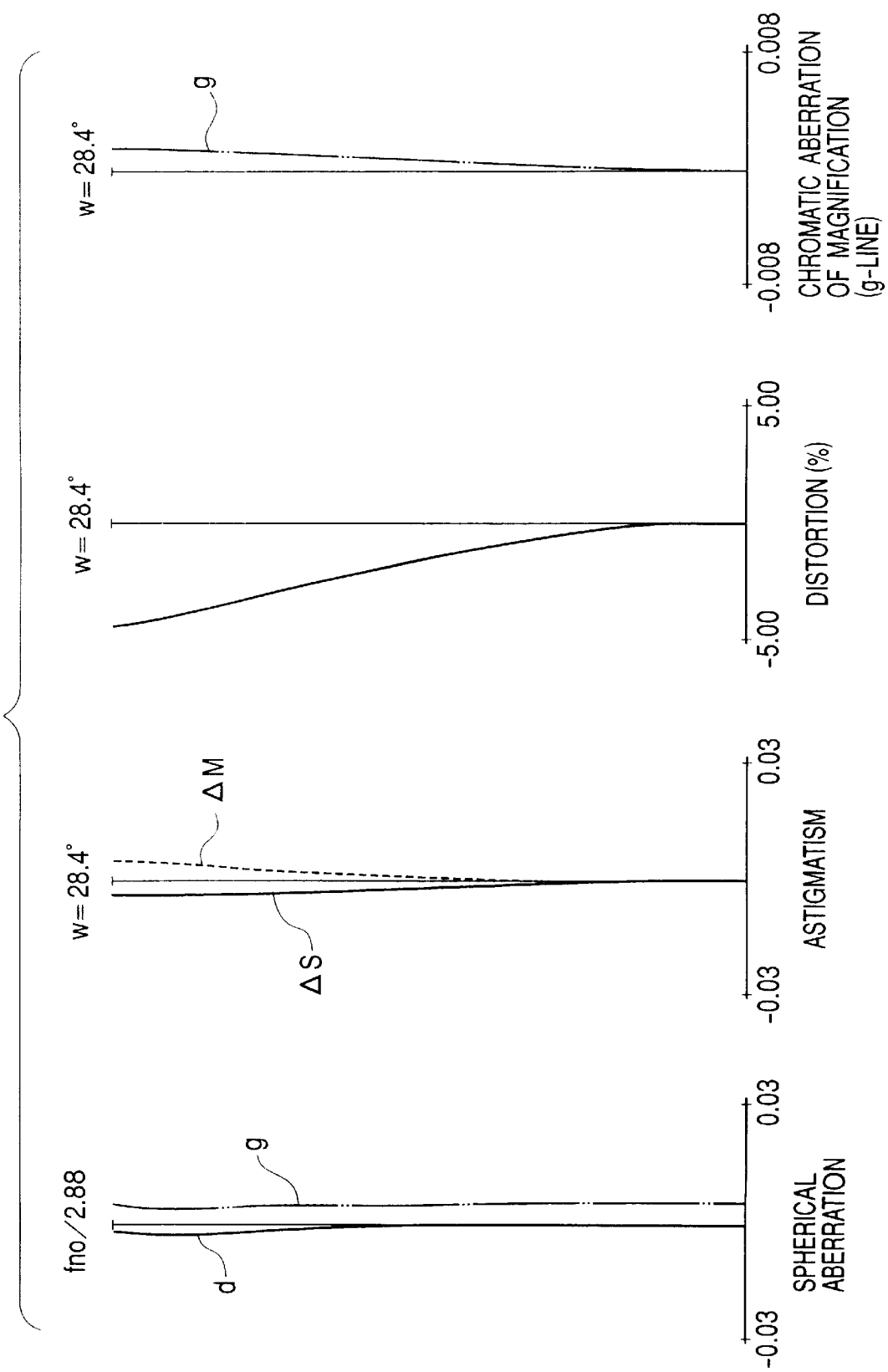
FIG. 10 shows the aberrations of Embodiment 3 at the wide angle end thereof.
Figure 11:
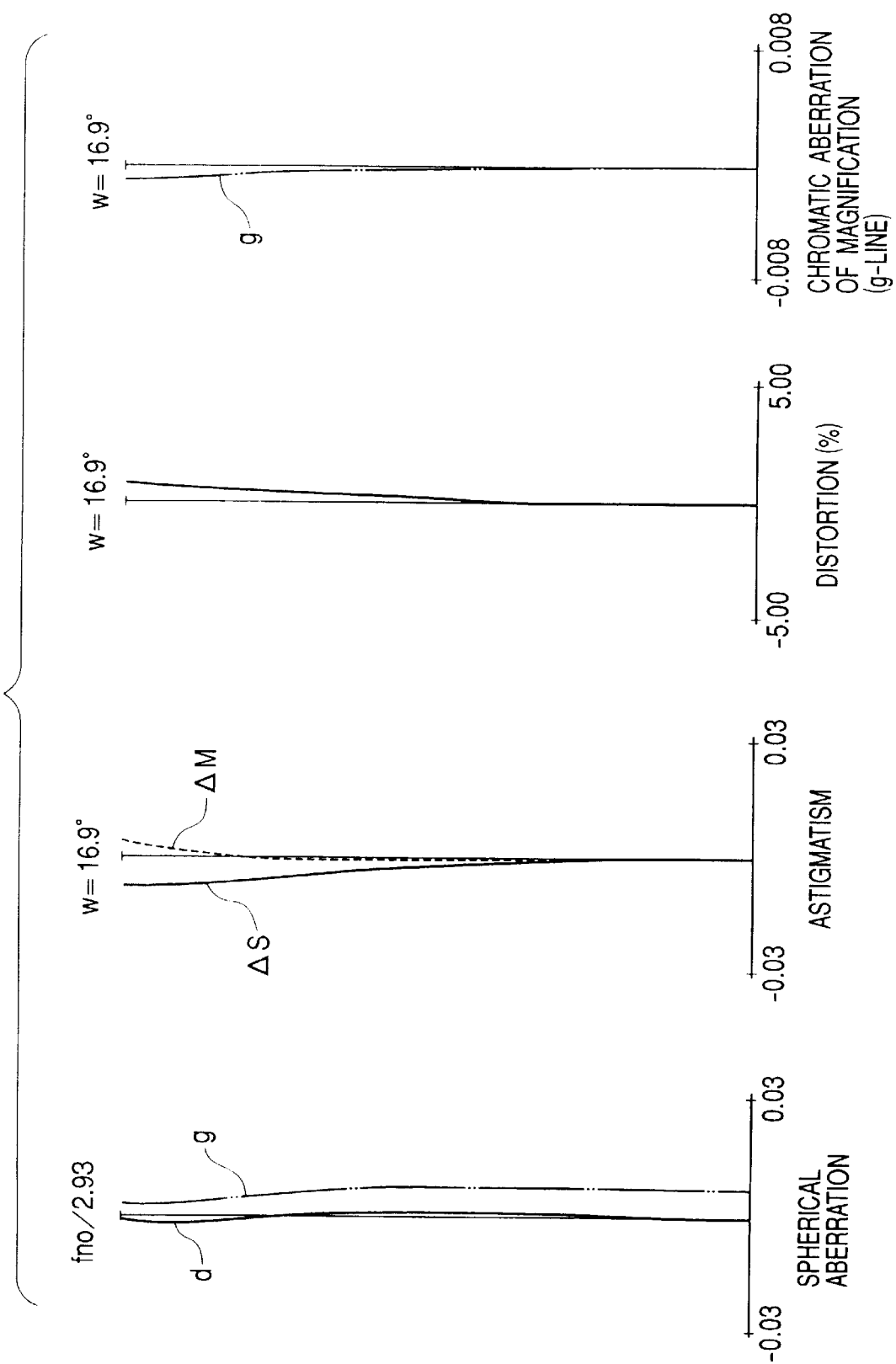
FIG. 11 shows the aberrations of Embodiment 3 at the middle thereof.
Figure 12:
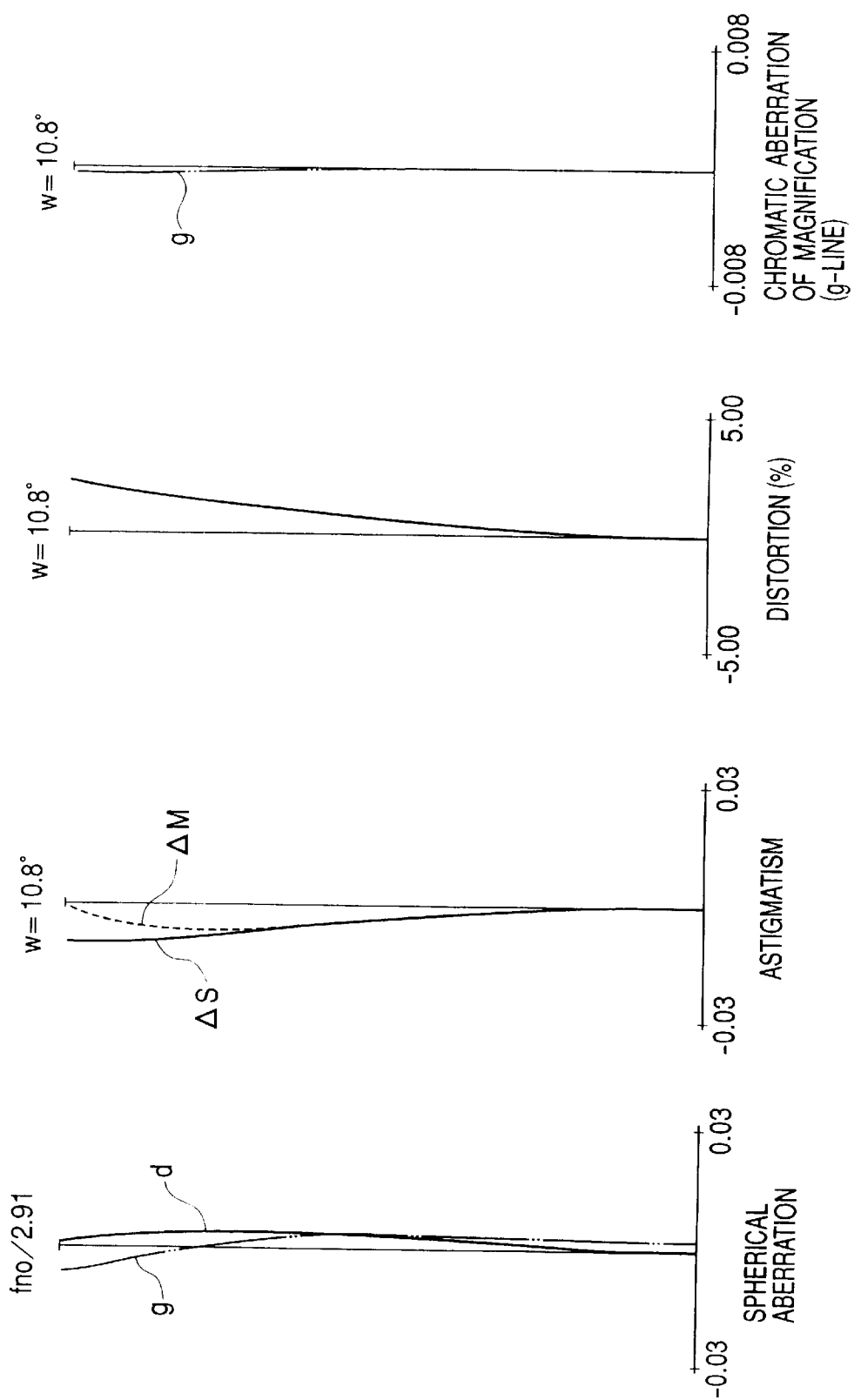
FIG. 12 shows the aberrations of Embodiment 3 at the telephoto end thereof.

Also, FIGS. 10 to 12 show the aberrations of Embodiment 3 at the wide angle end, the middle and the telephoto end, respectively, thereof.

In these figures, SP designates a stop, and P denotes a glass block such as a face plate or a low-pass filter. Also, d and g represent the d-line and the g-line, respectively, and $\Delta M$ and $\Delta S$ represent the meridional image plane and the sagittal image plane, respectively. Chromatic aberration of magnification is indicated for the g-line.

Also, in these embodiments, during the focal length change from the wide angle end to the telephoto end, a second lens unit is moved toward the image plane side as indicated by an arrow, and the fluctuation of the image plane resulting from the focal length change is corrected with the moving of a fourth lens unit.

Also, these embodiments adopt a rear-focus-type system in which the fourth lens unit is moved in the direction of the optical axis thereof to thereby effect focusing.

A characteristic and remarkable feature of these embodiments is found in the construction of a third lens unit. That is, the air space between the third lens unit and the fourth lens unit, which is a feature of this lens type, is effectively utilized by disposing the stop rearwardly (on the image side) of the third lens unit.

Also, by constructing the third lens unit of a positive lens whose image-plane side surface is convex toward the object side and aspherical, the number of lenses can be made small and downsizing can be achieved and also, an aspherical surface is disposed on the surface nearest to the stop to thereby correct spherical aberration and coma well.

Further, by constructing the fourth lens unit of a cemented lens comprising a biconcave lens and a biconvex lens, and a positive lens, the fluctuations of aberrations by the movement of the fourth lens unit are reduced.

By so constructing the zoom lens, the above-described characteristic feature can be achieved more effectively, but as another construction for achieving downsizing, there can be adopted a construction in which when the focal lengths of the entire system at the wide angle end and telephoto end of the zoom lens are defined as fw and ft, respectively, and the F number of the wide angle end is defined as FNW and the focal length of the second lens unit is defined as f2, the following conditional expression is satisfied:

$$0.8 < \{|f2/fA|\} \times FNW < 1.6, \qquad (1)$$

where $fA = \sqrt{fw \cdot ft}$.

That is, in a zoom lens of a type like that of the present invention, by making the second lens unit greatly contribute to the focal length change, it becomes possible to further strengthen the refractive power of the second lens unit and as the result, it becomes possible to reduce the amount of movement of the second lens unit, and the full length of the lens can be shortened.

However, this feature also concerned with the F number of the zoom lens, and this factor needs be taken into account. If the F number can be dark (can be great), it becomes possible to make f2 as small as possible, but in fact, a lens of such a specification is difficult to produce.

If the focal length becomes long beyond the upper limit value of conditional expression (1), it is preferable in terms of aberrations, but to obtain a desired zoom ratio, the amount of movement of the second lens unit must not be made great, resulting in bulkiness of the entire lens system and this is not preferable. Conversely, in the case below the lower limit value of conditional expression (1), the Petzval sum will become greatly negative and the image plane will come to fall down and therefore, it will become difficult to keep good optical performance. In this conditional expression, it is preferable that the upper limit value is 1.5 and the lower limit value is 0.9. Also, a construction which satisfies the following conditional expression can be adopted as another construction which shortens the imaging system.

$$0.8 < |R4F/f4| < 1.8, \qquad (2)$$

where R4F is the radius of curvature of that surface of the fourth lens unit which is most adjacent to the object side, and f4 is the focal length of the fourth lens unit.

In the case exceeding the upper limit value of conditional expression (2), the front side principal point position of the fourth lens unit will come out to the third lens unit side and therefore the full length will be extended, and this is not preferable. Conversely, in the case below the lower limit value of conditional expression (2), the radius of curvature will become too small and aberrations created in this surface will become great and difficult to correct by the fourth lens unit and at the same time, the distance of the fourth lens unit from the third lens unit will become small, and the third lens unit will come to interfere with the stop.

Also, good correction of aberrations can be achieved by satisfying the following conditional expression:

$$2.7 < |R2R/f2| < 7.4, \qquad (3)$$

where R2R represents the radius of curvature of that surface of the second lens unit which is most adjacent to the image plane side, and f2 represents the focal length of the second lens unit.

When the variable power ratio is to be increased in the zoom-type system like the present embodiment, it is necessary to increase the amount of movement of the second lens unit greatly contributing to the focal-length changing function or to shorten the focal-length of the second lens unit. The former method results in the bulkiness of the zoom lens and this is not preferable, and according to the latter method, the lens does not become bulky, but yet a great burden is applied to the second lens unit and it becomes difficult to keep the optical performance good. So, by designing the second lens unit as described above, the optical performance can be corrected well. In the case exceeding the upper limit value of conditional expression (3), coma cannot be corrected, and conversely, in the case below the lower limit value of conditional expression (3), the second lens surface most adjacent the image plane side has a sharp radius of curvature, and the second lens unit will interfere with the third lens unit at the telephoto end, and this will pose a problem. Therefore, it is preferable in conditional expression (3), that the upper limit value is 5.0.

Better correction of aberrations can be achieved by satisfying the following conditional expression:

$$11 < |R2F/f2| < 84, \qquad (4)$$

where R2F represents the radius of curvature of that surface of the second lens unit which is most adjacent to the object side, and f2 represents the focal length of the second lens unit.

In the case exceeding the upper limit value of conditional expression (4), the second lens unit will come to interfere with the first lens unit at the wide angle end and the downsizing of the zoom lens will become difficult, and this is not preferable. Conversely, in the case below the lower limit value of conditional expression (4), the performance of off-axis rays of light will become aggravated. Particularly, off-axis flare will become great, and this is not preferable. If in this conditional expression (4), the upper limit value is 75 and the lower limit value is 13, it will be more preferable.

Also, it is more preferable to dispose the aspherical surface of the fourth lens unit on the surface of that lens which is most adjacent to the image plane side because it can be effectively utilized for the correction of the off-axis rays of light.

The aspherical surface should preferably be of a shape in which the refractive power becomes weaker toward the peripheral portion of the lens.

Also, good correction of the fluctuations of aberrations can be achieved by satisfying the following conditional expression:

$$0.002<|R4s/\{f4sx(v4p-v4n)\}|<0.02, \quad (5)$$

where f4s and R4s represent the combined focal length of the cemented lens of the fourth lens unit of the zoom lens and the radius of curvature of the cemented surface, respectively, and v4n and v4p represent the Abbe numbers of the negative lens and the positive lens, respectively, of the cemented lens.

The fourth lens unit bears the burden of correction of the image plane, but the amount of movement resulting therefrom is great and the fluctuations of aberrations must be corrected well. Particularly, when a lens suited also for still images like the present lens is to be provided, chromatic aberration becomes important. In the case not within the range of conditional expression (5), chromatic aberration will become aggravated, and this is not preferable. In the case exceeding the upper limit value of conditional expression (5), chromatic aberration of magnification will become over-corrected. Conversely, in the case below the lower limit value of conditional expression (5), chromatic aberration of magnification will become under-corrected, and this is not preferable.

Also, the optimum refractive power for achieving the downsizing of the zoom lens can be obtained by satisfying the following conditional expression:

$$0.68<f3/f4<0.97, \quad (6)$$

where f3 and f4 represent the focal lengths of the third lens unit and fourth lens unit, respectively, of the zoom lens.

Conditional expression (6) represents the optimum refractive power distribution for achieving the downsizing of the third lens unit and fourth lens unit which are an imaging system. Particularly, it is for causing a light beam emerging from the third lens unit to substantially afocally enter the fourth lens unit and securing an optimum back focal length when the spacing between the third lens unit and the fourth lens unit is made optimum.

In the case exceeding the upper limit value of conditional expression (6), the light beam emerging from the third lens unit will break away from an afocal state and the fourth lens unit will become bulky, and the fluctuations of aberrations resulting from the movement of the fourth lens unit will become great, and this is not preferable. Conversely, in the case below the lower limit value of conditional expression (6), the refractive power of the fourth lens unit will become weak and the amount of movement thereof for focusing will become great and the full length will become great.

Also, well-balanced correction of curvature of the image field can be achieved by satisfying the following conditional expression:

$$1.83<N2f<1.91, \quad (7)$$

where N2f represents the refractive index of the medium of the negative lens of the second lens unit which is most adjacent to the object side.

This is a condition which is concerned with the Petzval sum and corrects curvature of the image field well-balancedly. In the case exceeding the upper limit value of conditional expression (7), the curvature of the image field will become advantageous, but when an actually usable glass material is taken into consideration, the Abbe number will become small and the correction of chromatic aberration will become difficult. Conversely, in the case below the lower limit value of conditional expression (7), the image plane will become curved so as to be concave toward the object side, and this is not preferable.

Also, the appropriate prescribing of the movement of the fourth lens unit can be achieved by satisfying the following conditional expression:

$$0.05<(D3w-D3T)/fA<0.14, \quad (8)$$

where D3w represents the distance between the third lens unit and the fourth lens unit when focusing on an infinity object at the wide angle end and D3T represents the distance between the third lens unit and the fourth lens unit when focusing on an infinity object at the telephoto end.

Conditional expression (8) is a condition which prescribes the movement of the fourth lens unit, and in the case exceeding the upper limit value thereof, the amount of movement of the fourth lens unit will become great and the full length will become great, and this is not preferable. Conversely, in the case below the lower limit value of conditional expression (8), the fluctuations of aberrations will become great and it will become difficult to obtain good optical performance.

Also, the well-balanced downsizing of the lens can be achieved by satisfying the following conditional expression:

$$1.75<N1r<1.91, \quad (9)$$

where N1r represents the refractive index of the medium of the positive lens of the first lens unit which is most adjacent to the image plane side.

This is a condition which is concerned with the lens diameter of the first lens unit and well-balancedly downsizes the lens.

In the case exceeding the upper limit value of conditional expression (9), it will become advantageous for reducing the lens diameter of the first lens unit, but when an actually usable glass material is taken into consideration, the Abbe number will become small and the correction of chromatic aberration will become difficult. Conversely, in the case below the lower limit value of conditional expression (9), the lens diameter of the first lens unit will become large and the downsizing of the lens will become difficult, and this is not preferable.

Items regarding numerical value embodiments will be described below.

In these numerical value embodiments, Ri represents the radius of curvature of the ith lens surface from the object side, Di represents the thickness and air space of the ith lens from the object side, and Ni and vi represent the refractive index and Abbe number, respectively, of the glass of the ith lens from the object side.

The aspherical shape is represented by the following expression when the direction of the optical axis is the X-axis and a direction orthogonal to the optical axis is the H-axis and the direction of travel of light is positive and the paraxial radius of curvature is defined as R and respective aspherical surface coefficients are defined as K, B, C, D, E and F.

$$x = \frac{(1/R)H^2}{1 + \sqrt{1-(1+K)(H/R)^2}} + BH^4 + CH^6 + DH^8 + EH^{10} + FH^{12}$$

Also, for example, the indication "e–Z" means "$10^{-Z}$".

The relations among the aforementioned conditions, expressions, and numerical values in the numerical value embodiments are shown in Table 1 below. Also, conditions in the respective numerical embodiments are shown in Tables 2 to 4 below.

TABLE 1

| Conditional Expressions | Numerical Value Embodiments | | |
|---|---|---|---|
| | 1 | 2 | 3 |
| (1) 0.8<{\|f2/fA\|}×FNW<1.6 | 1.30 | 1.32 | 1.47 |
| (2) 0.8<\|R4F/f4\|<1.8 | 1.36 | 1.17 | 1.08 |
| (3) 2.7<\|R2R/f2\|<7.4 | 4.28 | 3.53 | 3.04 |
| (4) 11<\|R2F/f2\|<84 | 64.3 | 18.5 | 18.2 |
| (5) 0.002<\|R4s/{f4sx(v4p–v4n)}\|<0.02 | 0.008 | 0.009 | 0.003 |
| (6) 0.68<f3/f4<0.97 | 0.84 | 0.77 | 0.83 |
| (7) 1.83<N2f<1.91 | 1.88 | 1.88 | 1.83 |
| (8) 0.05<(D3w–D3T)/fA<0.14 | 0.108 | 0.085 | 0.060 |
| (9) 1.75<N1r<1.91 | 1.77 | 1.80 | 1.77 |

TABLE 2

Numerical Value Embodiment 1 f = 1 to 2.83   Fno = 2.88 to 2.96   2ω = 56.8 to 21.6

| R1 = 4.676 | D1 = 0.16 | N1 = 1.846660 | v1 = 23.9 |
|---|---|---|---|
| R2 = 2.483 | D2 = 0.85 | N2 = 1.487490 | v2 = 70.2 |
| R3 = −19.772 | D3 = 0.03 | | |
| R4 = 2.066 | D4 = 0.52 | N3 = 1.772499 | v3 = 49.6 |
| R5 = 7.758 | D5 = variable | | |
| R6 = 48.727 | D6 = 0.09 | N4 = 1.882997 | v4 = 40.8 |
| R7 = 0.678 | D7 = 0.32 | | |
| R8 = −2.975 | D8 = 0.08 | N5 = 1.517417 | v5 = 52.4 |
| R9 = 0.763 | D9 = 0.37 | N6 = 1.846660 | v6 = 23.9 |
| R10 = 3.243 | D10 = variable | | |
| R11 = 1.712 | D11 = 0.23 | N7 = 1.583130 | v7 = 59.4 |
| R12* = −2.689 | D12 = 0.14 | | |
| R13 = stop | D13 = variable | | |
| R14 = −2.949 | D14 = 0.08 | N8 = 1.846660 | v8 = 23.9 |
| R15 = 1.574 | D15 = 0.32 | N9 = 1.712995 | v9 = 53.9 |
| R16 = −3.564 | D16 = 0.02 | | |
| R17 = 2.936 | D17 = 0.29 | N10 = 1.693500 | v10 = 53.2 |
| R18* = −2.060 | D18 = variable | | |
| R19 = ∞ | D19 = 0.19 | N11 = 1.516800 | v11 = 64.2 |
| R20 = ∞ | D20 = 0.20 | N12 = 1.552320 | v12 = 63.4 |
| R21 = ∞ | D21 = 0.12 | N13 = 1.556710 | v13 = 58.6 |
| R22 = ∞ | | | |

| Variable spacing\|Focal length | 1.00 | 1.78 | 2.83 |
|---|---|---|---|
| D5 | 0.14 | 0.68 | 1.03 |
| D10 | 1.09 | 0.56 | 0.20 |
| D13 | 0.56 | 0.38 | 0.38 |
| D18 | 0.81 | 0.99 | 0.99 |

*represents aspherical surface
aspherical surface coefficient

R12 K = −1.78442e+01
B = −1.81708e−02
C = 8.89960e−02

TABLE 2-continued

Numerical Value Embodiment 1

D = −2.48568e+00
E = 2.40532e+01
F = −4.51092e+01
R18 k = −3.20254e+00
B = 1.49323e−02
C = 3.99194e−02
D = −1.27077e−01
E = −7.50519e−02
F = 9.38343e−01

TABLE 3

Numerical Value Embodiment 2 f = 1 to 2.84   Fno = 2.88 to 2.92   2ω 56.8 to 21.5

| R1 = 4.684 | D1 = 0.16 | N1 = 1.846660 | v1 = 23.9 |
|---|---|---|---|
| R2 = 2.356 | D2 = 0.86 | N2 = 1.487490 | v2 = 70.2 |
| R3 = −29.020 | D3 = 0.03 | | |
| R4 = 2.037 | D4 = 0.54 | N3 = 1.80400 | v3 = 46.6 |
| R5 = 7.688 | D5 = variable | | |
| R6 = 14.342 | D6 = 0.09 | N4 = 1.882997 | v4 = 40.8 |
| R7 = 0.653 | D7 = 0.33 | | |
| R8 = −4.359 | D8 = 0.08 | N5 = 1.517417 | v5 = 52.4 |
| R9 = 0.727 | D9 = 0.39 | N6 = 1.846660 | v6 = 23.9 |
| R10 = 2.729 | D10 = variable | | |
| R11 = 2.010 | D11 = 0.23 | N7 = 1.583130 | v7 = 59.4 |
| R12* = −1.940 | D12 = 0.14 | | |
| R13 = stop | D13 = variable | | |
| R14 = −2.628 | D14 = 0.08 | N8 = 1.846660 | v8 = 23.9 |
| R15 = 1.363 | D15 = 0.34 | N9 = 1.719995 | v9 = 50.2 |
| R16 = −3.364 | D16 = 0.03 | | |
| R17 = 3.680 | D17 = 0.29 | N10 = 1.693500 | v10 = 53.2 |
| R18* = −1.822 | D18 = variable | | |
| R19 = ∞ | D19 = 0.19 | N11 = 1.516800 | v11 = 64.2 |
| R20 = ∞ | D20 = 0.20 | N12 = 1.552320 | v12 = 63.4 |
| R21 = ∞ | D21 = 0.12 | N13 = 1.556710 | v13 = 58.6 |
| R22 = ∞ | | | |

| Variable spacing\|Focal length | 1.00 | 1.78 | 2.84 |
|---|---|---|---|
| D5 | 0.13 | 0.67 | 1.03 |
| D10 | 1.10 | 0.56 | 0.20 |
| D13 | 0.53 | 0.36 | 0.39 |
| D18 | 0.81 | 0.98 | 0.95 |

*represents aspherical surface
aspherical surface coefficient

R12 k = −9.48459e+00
B = −5.84372e−02
C = 1.76173e−01
D = −2.61393e+00
E = 2.13105e+01
F = −2.86457e+01
R18 k = −2.34704e+00
B = 2.27029e−03
C = 2.25307e−02
D = −2.22551e−01
E = 4.13005e−01
F = 3.45104e−01

TABLE 4

Numerical Value Embodiment 3 f = 1 to 2.84   Fno = 2.88 to 2.91   2ω = 56.8 to 21.6

| R1 = 4.887 | D1 = 0.16 | N1 = 1.846660 | v1 = 23.9 |
|---|---|---|---|
| R2 = 2.457 | D2 = 0.83 | N2 = 1.487490 | v2 = 70.2 |
| R3 = −27.998 | D3 = 0.03 | | |
| R4 = 2.132 | D4 = 0.53 | N3 = 1.772499 | v3 = 49.6 |
| R5 = 8.454 | D5 = variable | | |
| R6 = 15.623 | D6 = 0.09 | N4 = 1.834807 | v4 = 42.7 |
| R7 = 0.683 | D7 = 0.34 | | |
| R8 = −5.683 | D8 = 0.08 | N5 = 1.517417 | v5 = 52.4 |

TABLE 4-continued

Numerical Value Embodiment 3

| | | | |
|---|---|---|---|
| R9 = 0.745 | D9 = 0.39 | N6 = 1.846660 | v6 = 23.9 |
| R10 = 2.610 | D10 = variable | | |
| R11 = 1.975 | D11 = 0.23 | N7 = 1.583130 | v7 = 59.4 |
| R12* = 2.220 | D12 = 0.14 | | |
| R13 = stop | D13 = variable | | |
| R14 = −2.373 | D14 = 0.08 | N8 = 1.846660 | v8 = 23.9 |
| R15 = 1.647 | D15 = 0.34 | N9 = 1.696797 | v9 = 55.5 |
| R16 = −1.995 | D16 = 0.03 | | |
| R17* = 4.685 | D17 = 0.29 | N10 = 1.693500 | v10 = 53.2 |
| R18 = −2.134 | D18 = variable | | |
| R19 = ∞ | D19 = 0.19 | N11 = 1.516800 | v11 = 64.2 |
| R20 = ∞ | D20 = 0.20 | N12 = 1.552320 | v12 = 63.4 |
| R21 = ∞ | D21 = 0.12 | N13 = 1.556710 | v13 = 58.6 |
| R22 = ∞ | | | |

| Variable spacing\|Focal length | 1.00 | 1.78 | 2.84 |
|---|---|---|---|
| D5 | 0.13 | 0.72 | 1.11 |
| D10 | 1.19 | 0.60 | 0.20 |
| D13 | 0.50 | 0.35 | 0.39 |
| D18 | 0.81 | 0.95 | 0.91 |

*represents aspherical surface
aspherical surface coefficient

R12 k = −1.42973e+01
B = −6.32396e−02
C = 2.28644e−01
D = −3.08094e+00
E = 3.29424e+01
F = −1.00656e+02
R17 k = −2.36804e+01
B = −7.72564e−03
C = 1.07650e−02
D = −8.96955e−03
E = −1.55468e−01
F = 4.21895e−01

An embodiment of a video still camera using the zoom lens of the present invention as a photo-taking optical system will now be described with reference to FIG. 13.

Figure 13:
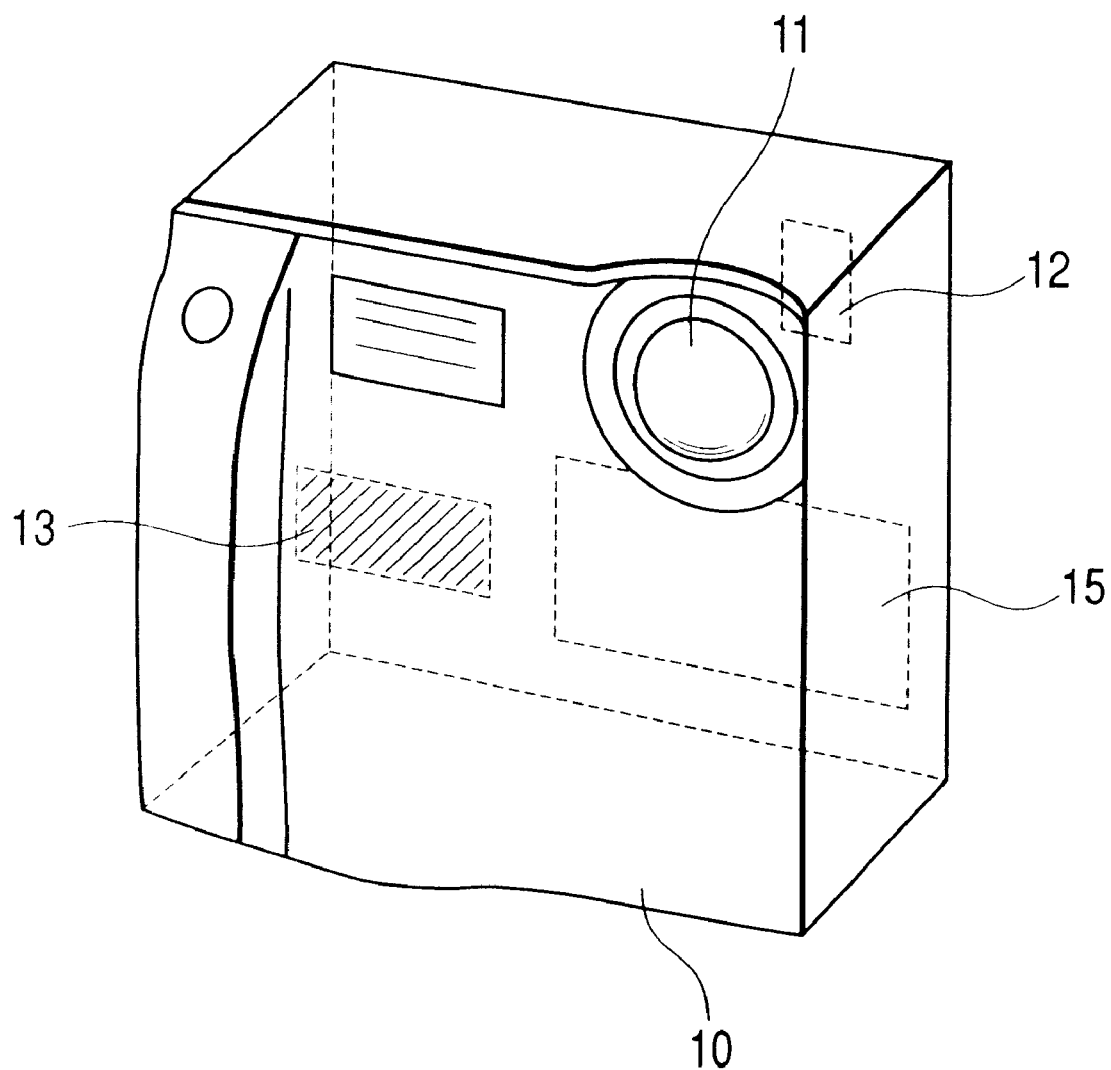
FIG. 13 is a conceptional view of a video still camera using the zoom lens of the present invention as a phototaking optical system.

In FIG. 13, reference numeral 10 designates the main body of the video still camera, reference numeral 11 denotes a photo-taking optical system constituted by the zoom lens of the present invention, reference numeral 12 designates an image pickup element such as a CCD for receiving an object image by the photo-taking optical system 11, and reference numeral 13 denotes recording means for recording the object image received by the image pickup element 12, and the object image displayed on the display element thereof is observed through a finder, not shown. The display element is constituted by a liquid crystal panel or the like, and the object image formed on the image pickup element 12 is displayed. Reference numeral 15 designates a liquid crystal display panel having a function equal to that of the aforementioned finder.

As described above, the zoom lens of the present invention can be applied to an optical apparatus such as a video still camera to thereby realize a compact optical apparatus having high optical performance.

What is claimed is:

1. A rear focus type zoom lens having, in succession from the object side, a first lens unit of positive refractive power, a second lens unit of negative refractive power, a third lens unit of positive refractive power and a fourth lens unit of positive refractive power, wherein said third lens unit has a stop most adjacent to the image plane side, the surface thereof adjacent to said stop being convex toward the image plane side and aspherical, and when the focal lengths of the entire system at the wide angle end and the telephoto end are defined as fw and ft, respectively, and the F number of the wide angle end is defined as FNW, and the focal length of the second lens unit is defined as f2, the following conditional expression is satisfied:

$$0.8 < \{|f2/fA|\} \times FNW < 1.6$$

$$(fA = \sqrt{fw \cdot ft}).$$

2. A rear focus type zoom lens according to claim 1, wherein during a focal length change from the wide angle end to the telephoto end, said second lens unit is moved toward the image plane side, and when correction of the fluctuation of the image plane resulting from said focal length change is to be effected, said fourth lens unit is moved.

3. A rear focus type zoom lens according to claim 1, wherein said second lens unit has, in succession from the object side, a negative meniscus lens and a cemented lens comprising a biconcave lens and a positive lens.

4. A rear focus type zoom lens according to claim 1, wherein that surface of said second lens unit which is most adjacent to the image plane side is concave toward the image plane side.

5. A rear focus type zoom lens according to claim 1, wherein when the radius of curvature of that surface of said second lens unit which is most adjacent to the image plane side is defined as R2R, and the focal length of the second lens unit is defined as f2, the following conditional expression is satisfied:

$$2.7 < |R2R/f2| < 7.4.$$

6. A rear focus type zoom lens according to claim 1, wherein when the radius of curvature of that surface of said second lens unit which is most adjacent to the object side is defined as R2F, and the focal length of the second lens unit is defined as f2, the following conditional expression is satisfied:

$$11 < |R2F/f2| < 84.$$

7. A rear focus type zoom lens according to claim 1, wherein when the refractive index of the medium of a negative lens of said second lens unit which is most adjacent to the object side is defined as N2f, the following conditional expression is satisfied:

$$1.83 < N2f < 1.91.$$

8. A rear focus type zoom lens according to claim 1, wherein said fourth lens unit has a cemented lens comprising a biconcave lens and a biconvex lens, and a positive lens.

9. A rear focus type zoom lens according to claim 1, wherein said fourth lens unit has at least one aspherical surface.

10. A rear focus type zoom lens according to claim 1, wherein at least one of the surfaces of a positive lens of said fourth lens unit has an aspherical surface.

11. A rear focus type zoom lens according to claim 1, wherein that surface of said fourth lens unit which is most adjacent to the object side is concave toward the object side, and when the radius of curvature of that surface of said fourth lens unit which is most adjacent to the object side is defined as R4F, and the focal length of the fourth lens unit is defined as f4, the following conditional expression is satisfied:

$$0.8 < |R4F/f4| < 1.8.$$

12. A rear focus type zoom lens according to claim 1, wherein when the combined focal length of a cemented lens of said fourth lens unit and the radius of curvature of the cemented surface thereof are defined as f4s and R4s, respectively, and the Abbe numbers of a negative lens and a positive lens of said cemented lens are defined as ν4n and ν4p, respectively, the following conditional expression is satisfied:

$$0.002<|R4s/\{f4s(\nu 4p-\nu 4n)\}|<0.02.$$

13. A rear focus type zoom lens according to claim 1, wherein when the focal lengths of said third lens unit and said fourth lens unit are defined as f3 and f4, respectively, the following conditional expression is satisfied:

$$0.68<f3/f4<0.97.$$

14. A rear focus type zoom lens according to claim 1, wherein the following conditional expression is satisfied:

$$0.05<(D3w-D3T)/fA<0.14,$$

where D3w represents the distance between the third lens unit and the fourth lens unit when focusing on an infinity object at the wide angle end and D3T represents the distance between the third lens unit and the fourth lens unit when focusing on an infinity object at the telephoto end.

15. A rear focus type zoom lens according to claim 1, wherein said first lens unit has, in succession from the object side, a cemented lens comprising a negative meniscus lens having its strong concave surface facing the image plane side and a positive lens, and a positive meniscus lens having its strong convex surface facing the object side.

16. A rear focus type zoom lens according to claim 1, wherein said first lens unit has a cemented lens, and the Abbe number of a positive lens of said cemented lens is 65 or greater.

17. A rear focus type zoom lens according to claim 1, wherein when the refractive index of the medium of a positive lens of said first lens unit which is most adjacent to the image plane side is defined as N1r, the following conditional expression is satisfied:

$$1.75<N1r<1.91.$$

18. An optical apparatus comprising by a rear focus type zoom lens according to claim 1.

19. A rear focus type zoom lens having, in succession from the object side, a first lens unit of positive refractive power, a second lens unit of negative refractive power, a third lens unit of positive refractive power and a fourth lens unit of positive refractive power, wherein said third lens unit has a stop most adjacent to the image plane side, the surface thereof adjacent to said stop is convex toward the image plane side and aspherical, and that surface of said fourth lens unit which is most adjacent to the object side is concave toward the object side, and when the radius of curvature of that surface of said fourth lens unit which is most adjacent to the object side is defined as R4F and the focal length of the fourth lens unit is defined as f4, the following conditional expression is satisfied:

$$0.8<|R4F/f4|<1.8.$$

20. A rear focus type zoom lens according to claim 19, wherein during a focal length change from the wide angle end to the telephoto end, the second lens unit is moved toward the image plane side, and when correction of the fluctuation of the image plane resulting from said focal length change is to be effected, said fourth lens unit is moved.

21. A rear focus type zoom lens according to claim 19, wherein said second lens unit has, in succession from the object side, a negative meniscus lens, and a cemented lens comprising a biconcave lens and a positive lens.

22. A rear focus type zoom lens according to claim 19, wherein that surface of said second lens unit which is most adjacent to the image plane side is concave toward the image plane side.

23. A rear focus type zoom lens according to claim 19, wherein when the radius of curvature of that surface of said second lens unit which is most adjacent to the image plane side is defined as R2R, and the focal length of the second lens unit is defined as f2, the following conditional expression is satisfied:

$$2.7<|R2R/f2|<7.4.$$

24. A rear focus type zoom lens according to claim 19, wherein when the radius of curvature of that surface of said second lens unit which is most adjacent to the object side is defined as R2F, and the focal length of the second lens unit is defined as f2, the following conditional expression is satisfied:

$$11<|R2F/f2|<84.$$

25. A rear focus type zoom lens according to claim 19, wherein when the refractive index of the medium of the negative lens of said second lens unit which is most adjacent to the object side is defined as N2f, the following conditional expression is satisfied:

$$1.83<N2f<1.91.$$

26. A rear focus type zoom lens according to claim 19, wherein when the focal lengths of the entire system at the wide angle end and the telephoto end are defined as fw and ft, respectively, and the F number of the wide angle end is defined as FNW and the focal length of the second lens unit is defined as f2, the following conditional expression is satisfied:

$$0.8<\{|f2/fA|\}\times FNW<1.6$$

$$(fA=\sqrt{fw\cdot ft}).$$

27. A rear focus type zoom lens according to claim 19, wherein said fourth lens unit has a cemented lens comprising a biconcave lens and a biconvex lens, and a positive lens.

28. A rear focus type zoom lens according to claim 19, wherein said fourth lens unit has at least one aspherical surface.

29. A rear focus type zoom lens according to claim 19, wherein at least one of the surfaces of a positive lens of said fourth lens unit has an aspherical surface.

30. A rear focus type zoom lens according to claim 19, wherein when the combined focal length of a cemented lens of the fourth lens unit and the radius of curvature of the cemented surface thereof are defined as f4s and R4s, respectively, and the Abbe numbers of a negative lens and a positive lens of said cemented lens are defined as ν4n and ν4p, respectively, the following conditional expression is satisfied:

$$0.002<|R4s/\{f4s(\nu 4p-\nu 4n)\}|<0.02.$$

31. A rear focus type zoom lens according to claim 19, wherein when the focal lengths of the third lens unit and the fourth lens unit are defined as f3 and f4, respectively, the following conditional expression is satisfied:

$$0.68 < f3/f4 < 0.97.$$

32. A rear focus type zoom lens according to claim 19, wherein the following conditional expression is satisfied:

$$0.05 < (D3w - D3T)/fA < 0.14,$$

where D3w represents the distance between the third lens unit and the fourth lens unit when focusing on an infinity object at the wide angle end and D3T represents the distance between the third lens unit and the fourth lens unit when focusing on an infinity object at the telephoto end.

33. A rear focus type zoom lens according to claim 19, wherein said first lens unit has, in succession from the object side, a cemented lens comprising a negative meniscus lens having its strong concave surface facing the image plane side and a positive lens, and a positive meniscus lens having its strong convex surface facing the object side.

34. A rear focus type zoom lens according to claim 19, wherein said first lens unit has a cemented lens, and the Abbe number of the positive lens of said cemented lens is 65 or greater.

35. A rear focus type zoom lens according to claim 19, wherein when the refractive index of the medium of a positive lens of said first lens unit which is most adjacent to the image plane side is defined as N1r, the following conditional expression is satisfied:

$$1.75 < N1r < 1.91.$$

36. An optical apparatus comprising a rear focus type zoom lens according to claim 19.

37. A rear focus type zoom lens having, in succession from the object side, a first lens unit of positive refractive power, a second lens unit of negative refractive power, a third lens unit of positive refractive power and a fourth lens unit of positive refractive power, wherein said third lens unit has a stop most adjacent to the image plane side, and the surface thereof adjacent to said stop is convex toward the image plane side and aspherical, and when the radius of curvature of that surface of said second lens unit which is most adjacent to the object side is defined as R2F and the focal length of the second lens unit is defined as f2, the following conditional expression is satisfied:

$$11 < |R2F/f2| < 84.$$

38. A rear focus type zoom lens according to claim 37, wherein during a focal length change from the wide angle to the telephoto end, the second lens unit is moved toward the image plane side, and when correction of the fluctuation of the image plane resulting from said focal length change is to be effected, said fourth lens unit is moved.

39. A rear focus type zoom lens according to claim 37, wherein said second lens unit has, in succession from the object side, a negative meniscus lens and a cemented lens comprising a biconcave lens and a positive lens.

40. A rear focus type zoom lens according to claim 37, wherein that surface of said second lens unit which is most adjacent to the image plane side is concave toward the image plane side.

41. A rear focus type zoom lens according to claim 37, wherein when the radius of curvature of that surface of said second lens unit which is most adjacent to the image plane side is defined as R2R, and the focal length of the second lens unit is defined as f2, the following conditional expression is satisfied:

$$2.7 < |R2R/f2| < 7.4.$$

42. A rear focus type zoom lens according to claim 37, wherein when the refractive index of a negative lens of said second lens unit which is most adjacent to the object side is defined as N2f, the following conditional expression is satisfied:

$$1.83 < n2f < 1.91.$$

43. A rear focus type zoom lens according to claim 37, wherein when the focal lengths of the entire system at the wide angle end and the telephoto end are defined as fw and ft, respectively, and the F number of the wide angle end is defined as FNW, and the focal length of the second lens unit is defined as f2, the following conditional expression is satisfied:

$$0.8 < \{|f2/fA|\} \times FNW < 1.6$$

$$(fA = \sqrt{fw \cdot ft}).$$

44. A rear focus type zoom lens according to claim 37, wherein said fourth lens unit has a cemented lens comprising a biconcave lens and a biconvex lens, and a positive lens.

45. A rear focus type zoom lens according to claim 37, wherein said fourth lens unit has at least one aspherical surface.

46. A rear focus type zoom lens according to claim 37, wherein at least one of the surfaces of a positive lens of said fourth lens unit has an aspherical surface.

47. A rear focus type zoom lens according to claim 37, wherein that surface of said fourth lens unit which is most adjacent to the object side is concave toward the object side, and when the radius of curvature of that surface of said fourth lens unit which is most adjacent to the object side is defined as R4F, and the focal length of the fourth lens unit is defined as f4, the following conditional expression is satisfied:

$$0.8 < |R4F/f4| < 1.8.$$

48. A rear focus type zoom lens according to claim 37, wherein when the combined focal length of a cemented lens of the fourth lens unit and the radius of curvature of the cemented surface thereof are defined as f4s and R4s, respectively, and the Abbe numbers of a negative lens and a positive lens of said cemented lens are defined as ν4n and ν4p, respectively, the following conditional expression is satisfied:

$$0.002 < |R4s/\{f4s(\nu 4p - \nu 4n)\}| < 0.02.$$

49. A rear focus type zoom lens according to claim 37, wherein when the focal lengths of the third lens unit and the fourth lens unit are defined as f3 and f4, respectively, the following conditional expression is satisfied:

$$0.68 < f3/f4 < 0.97.$$

50. A rear focus type zoom lens according to claim 37, wherein the following conditional expression is satisfied:

$$0.05 < (D3w - D3T)/fA < 0.14,$$

where D3w represents the distance between the third lens unit and the fourth lens unit when focusing on an infinity object at the wide angle end and D3T represents the distance between the third lens unit and the fourth lens unit when focusing on an infinity object at the telephoto end.

51. A rear focus type zoom lens according to claim 37, wherein said first lens unit has, in succession from the object side, a cemented lens comprising a negative meniscus lens having its strong concave surface facing the image plane side and a positive lens, and a positive meniscus lens having its strong convex surface facing the object side.

52. A rear focus type zoom lens according to claim 37, wherein said first lens unit has a cemented lens, and the Abbe number of a positive lens of said cemented lens is 65 or greater.

53. A rear focus type zoom lens according to claim 37, wherein when the refractive index of the medium of a positive lens of said first lens unit which is most adjacent to the image plane side is defined as N1r, the following conditional expression is satisfied:

$$1.75 < N1r < 1.91.$$

54. An optical apparatus comprising a rear focus type zoom lens according to claim 37.

55. A rear focus type zoom lens having, in succession from the object side, a first lens unit of positive refractive power, a second lens unit of negative refractive power, a third lens unit of positive refractive power and a fourth lens unit of positive refractive power, wherein said third lens unit has a stop most adjacent to the image plane side, and the surface thereof adjacent to said stop is convex toward the image plane side and aspherical, and when the refractive index of the medium of the negative lens of said second lens unit which is most adjacent to the object side is defined as N2f, the following conditional expression is satisfied:

$$1.83 < N2f < 1.91.$$

56. A rear focus type zoom lens according to claim 55, wherein during a focal length change from the wide angle end to the telephoto end, the second lens unit is moved toward the image plane side, and when correction of the fluctuation of the image plane resulting from said focal length change is to be effected, said fourth lens unit is moved.

57. A rear focus type zoom lens according to claim 55, wherein said second lens unit has, in succession from the object side, a negative meniscus lens and a cemented lens comprising a biconcave lens and a positive lens.

58. A rear focus type zoom lens according to claim 55, wherein that surface of said second lens unit which is most adjacent to the image plane side is concave toward the image plane side.

59. A rear focus type zoom lens according to claim 55, wherein when the radius of curvature of that surface of said second lens unit which is most adjacent to the image plane side is defined as R2R, and the focal length of the second lens unit is defined as f2, the following conditional expression is satisfied:

$$2.7 < |R2R/f2| < 7.4.$$

60. A rear focus type zoom lens according to claim 55, wherein when the radius of curvature of that surface of said second lens unit which is most adjacent to the object side is defined as R2F, and the focal length of the second lens unit is defined as f2, the following conditional expression is satisfied:

$$11 < |R2F/f2| < 84.$$

61. A rear focus type zoom lens according to claim 55, wherein when the focal lengths of the entire system at the wide angle end and the telephoto end are defined as fw and ft, respectively, and the F number of the wide angle end is defined as FNW, and the focal length of the second lens unit is defined as f2, the following conditional expression is satisfied:

$$0.8 < \{|f2/fA|\} \times FNW < 1.6$$

$$(fA = \sqrt{fw \cdot ft}).$$

62. A rear focus type zoom lens according to claim 55, wherein said fourth lens unit has a cemented lens comprising a biconcave lens and a biconvex lens, and a positive lens.

63. A rear focus type zoom lens according to claim 55, wherein said fourth lens unit has at least one aspherical surface.

64. A rear focus type zoom lens according to claim 55, wherein at least one of the surfaces of the positive lens of said fourth lens unit has an aspherical surface.

65. A rear focus type zoom lens according to claim 55, wherein that surface of said fourth lens unit which is most adjacent to the object side is concave toward the object side, and when the radius of curvature of that surface of said fourth lens unit which is most adjacent to the object side is defined as R4F, and the focal length of the fourth lens unit is defined as f4, the following conditional expression is satisfied:

$$0.8 < |R4F/f4| < 1.8.$$

66. A rear focus type zoom lens according to claim 55, wherein when the combined focal length of a cemented lens of the fourth lens unit and the radius of curvature of the cemented surface thereof are defined as f4s and R4s, respectively, and the Abbe numbers of a negative lens and a positive lens of said cemented lens are defined as ν4n and ν4p, respectively, the following conditional expression is satisfied:

$$0.002 < |R4s/\{f4s(\nu 4p - \nu 4n)\}| < 0.02.$$

67. A rear focus type zoom lens according to claim 55, wherein the focal lengths of the third lens unit and the fourth lens unit are defined as f3 and f4, respectively, the following conditional expression is satisfied:

$$0.68 < f3/f4 < 0.97.$$

68. A rear focus type zoom lens according to claim 55, wherein the following conditional expression is satisfied:

$$0.05 < (D3w - D3T)/fA < 0.14,$$

where D3w represents the distance between the third lens unit and the fourth lens unit when focusing on an infinity object at the wide angle end and D3T represents the distance between the third lens unit and the fourth lens unit when focusing on an infinity object at the telephoto end.

69. A rear focus type zoom lens according to claim 55, wherein said first lens unit has, in succession from the object side, a cemented lens comprising a negative meniscus lens having its strong concave surface facing the image plane side and a positive lens, and a positive meniscus lens having its strong convex surface facing the object side.

70. A rear focus type zoom lens according to claim 55, wherein said first lens unit has a cemented lens, and the Abbe number of a positive lens of said cemented lens is 65 or greater.

71. A rear focus type zoom lens according to claim 55, wherein when the refractive index of the medium of a positive lens of said first lens unit which is most adjacent to the image plane side is defined as N1r, the following conditional expression is satisfied:

$$1.75 < N1r < 1.91.$$

72. An optical apparatus comprising a rear focus type zoom lens according to claim 55.

73. A rear focus type zoom lens having, in succession from the object side, a first lens unit of positive refractive power, a second lens unit of negative refractive power, a third lens unit of positive refractive power and a fourth lens unit of positive refractive power, wherein said third lens unit has a stop most adjacent to the image plane side, and the surface thereof adjacent to said stop is convex toward the image plane side and aspherical, and wherein the following conditional expression is satisfied:

$$0.05 < (D3w - D3T)/fA < 0.14,$$

where D3w represents the distance between the third lens unit and the fourth lens unit when focusing on an infinity object at the wide angle end and D3T represents the distance between the third lens unit and the fourth lens unit when focusing on an infinity object at the telephoto end.

74. A rear focus type zoom lens according to claim 73, wherein during a focal length change from the wide angle end to the telephoto end, the second lens unit is moved toward the image plane side, and when correction of the fluctuation of the image plane resulting from said focal length change is to be effected, said fourth lens unit is moved.

75. A rear focus type zoom lens according to claim 73, wherein said second lens unit has, in succession from the object side, a negative meniscus lens and a cemented lens comprising a biconcave lens and a positive lens.

76. A rear focus type zoom lens according to claim 73, wherein that surface of said second lens unit which is most adjacent to the image plane side is concave toward the image plane side.

77. A rear focus type zoom lens according to claim 73, wherein when the radius of curvature of that surface of said second lens unit which is most adjacent to the image plane side is defined as R2R, and the focal length of the second lens unit is defined as f2, the following conditional expression is satisfied:

$$2.7 < |R2R/f2| < 7.4.$$

78. A rear focus type zoom lens according to claim 73, wherein when the radius of curvature of that surface of said second lens unit which is most adjacent to the object side is defined as R2F, and the focal length of the second lens unit is defined as f2, the following conditional expression is satisfied:

$$11 < |R2F/f2| < 84.$$

79. A rear focus type zoom lens according to claim 73, wherein when the refractive index of the medium of a negative lens of said second lens unit which is most adjacent to the object side is defined as N2f, the following conditional expression is satisfied:

$$1.83 < N2f < 1.91.$$

80. A rear focus type zoom lens according to claim 73, wherein when the focal lengths of the entire system at the wide angle end and the telephoto end are defined as fw and ft, respectively, and the F number of the wide angle end is defined FNW, and the focal length of the second lens unit is defined as f2, the following conditional expression is satisfied:

$$0.8 < \{|f2/fA|\} \times FNW < 1.6$$

$$(fA = \sqrt{fw \cdot ft}).$$

81. A rear focus type zoom lens according to claim 73, wherein said fourth lens unit has a cemented lens comprising a biconcave lens and a biconvex lens, and a positive lens.

82. A rear focus type zoom lens according to claim 73, wherein said fourth lens unit has at least one aspherical surface.

83. A rear focus type zoom lens according to claim 73, wherein at least one of the surfaces of a positive lens of said fourth lens unit has an aspherical surface.

84. A rear focus type zoom lens according to claim 73, wherein that surface of said fourth lens unit which is most adjacent to the object side is concave toward the object side, and when the radius of curvature of that surface of said fourth lens unit which is most adjacent to the object side is defined as R4F, and the focal length of the fourth lens unit is defined as f4, the following conditional expression is satisfied:

$$0.8 < |R4F/f4| < 1.8.$$

85. A rear focus type zoom lens according to claim 73, wherein when the combined focal length of a cemented lens of the fourth lens unit and the radius of curvature of the cemented surface thereof are defined as f4s and R4s, respectively, and the Abbe numbers of a negative lens and a positive lens of said cemented lens are defined as v4n and v4p, respectively, the following expression is satisfied:

$$0.002 < |R4s/\{f4s(v4p - v4n)\}| < 0.02.$$

86. A rear focus type zoom lens according to claim 73, wherein when the focal lengths of the third lens unit and the fourth lens unit are defined as f3 and f4, respectively, the following conditional expression is satisfied:

$$0.68 < f3/f4 < 0.97.$$

87. A rear focus type zoom lens according to claim 73, wherein said first lens unit has, in succession from the object side, a cemented lens comprising a negative meniscus lens having its strong concave surface facing the image plane side and a positive lens, and a positive meniscus lens having its strong convex surface facing the object side.

88. A rear focus type zoom lens according to claim 73, wherein said first lens unit has a cemented lens, and the Abbe number of a positive lens of said cemented lens is 65 or greater.

89. A rear focus type zoom lens according to claim 73, wherein when the refractive index of the medium of a positive lens of said first lens unit which is most adjacent to the image plane side is defined as N1r, the following conditional expression is satisfied:

$$1.75 < N1r < 1.91.$$

90. An optical apparatus comprising a rear focus type zoom lens according to claim 73.

91. A rear focus type zoom lens having, in succession from the object side, a first lens unit of positive refractive power, a second lens unit of negative refractive power, a third lens unit of positive refractive power and a fourth lens unit of positive refractive power, the second lens unit being moved to the image plane side during a focal length change from the wide angle end to the telephoto end, said fourth lens unit being moved when correction of the fluctuation of the image plane resulting from said focal length change is to be effected, wherein said third lens unit has a stop most adjacent to the image plane side, and the surface thereof adjacent to said stop is convex toward the image plane side and aspherical, and when the refractive index of the medium of the positive lens of said first lens unit which is most adjacent to the image plane is defined as N1r, the following conditional expression is satisfied:

$$1.75 < N1r < 1.91.$$

92. A rear focus type zoom lens according to claim 91, wherein said second lens unit has, in succession from the object side, a negative meniscus lens and a cemented lens comprising a biconcave lens and a positive lens.

93. A rear focus type zoom lens according to claim 91, wherein that surface of said second lens unit which is most adjacent to the image plane side is concave toward the image plane side.

94. A rear focus type zoom lens according to claim 91, wherein when the radius of curvature of that surface of said second lens unit which is most adjacent to the image plane side is defined as R2R, and the focal length of the second lens unit is defined as f2, the following conditional expression is satisfied:

$$2.7 < |R2R/f2| < 7.4.$$

95. A rear focus type zoom lens according to claim 91, wherein when the radius of curvature of that surface of said second lens unit which is most adjacent to the object side is defined as R2F, and the focal length of the second lens unit is defined as f2, the following conditional expression is satisfied:

$$11 < |R2F/f2| < 84.$$

96. A rear focus type zoom lens according to claim 91, wherein when the refractive index of the medium of a negative lens of said second lens unit which is most adjacent to the object side is defined as N2f, the following conditional expression is satisfied:

$$1.83 < N2f < 1.91.$$

97. A rear focus type zoom lens according to claim 91, wherein when the focal lengths of the entire system at the wide angle end and the telephoto end are defined as fw and ft, respectively, and the F number of the wide angle end is defined as FNW, and the focal length of the second lens unit is defined as f2, the following conditional expression is satisfied:

$$0.8 < \{|f2/fA|\} \times FNW < 1.6$$

$$(fA = \sqrt{fw \cdot ft}).$$

98. A rear focus type zoom lens according to claim 91, wherein said fourth lens unit has a cemented lens comprising a biconcave lens and a biconvex lens, and a positive lens.

99. A rear focus type zoom lens according to claim 91, wherein said fourth lens unit has at least one aspherical surface.

100. A rear focus type zoom lens according to claim 91, wherein at least one of the surfaces of a positive lens of said fourth lens unit has an aspherical surface.

101. A rear focus type zoom lens according to claim 91, wherein that surface of said fourth lens unit which is most adjacent to the object side is concave toward the object side, and when the radius of curvature of that surface of said fourth lens unit which is most adjacent to the object side is defined as R4F, and the focal length of the fourth lens unit is defined as f4, the following conditional expression is satisfied:

$$0.8 < |R4F/f4| < 1.8.$$

102. A rear focus type zoom lens according to claim 91, wherein when the combined focal length of a cemented lens of the fourth lens unit and the radius of curvature of the cemented surface thereof are defined as f4s and R4s, respectively, and the Abbe numbers of a negative lens and a positive lens of said cemented lens are defined as ν4n and ν4p, respectively, the following conditional expression is satisfied:

$$0.002 < |R4s/\{f4s(\nu 4p - \nu 4n)\}| < 0.02.$$

103. A rear focus type zoom lens according to claim 91, wherein when the focal lengths of the third lens unit and the fourth lens unit are defined as f3 and f4, respectively, the following conditional expression is satisfied:

$$0.68 < f3/f4 < 0.97.$$

104. A rear focus type zoom lens according to claim 91, wherein the following conditional expression is satisfied:

$$0.05 < (D3w - D3T)/fA < 0.14,$$

where D3w represents the distance between the third lens unit and the fourth lens unit when focusing on an infinity object at the wide angle end and D3T represents the distance between the third lens unit and the fourth lens unit when focusing on an infinity object at the telephoto end.

105. A rear focus type zoom lens according to claim 91, wherein said first lens unit has, in succession from the object side, a cemented lens comprising a negative meniscus lens having its strong concave surface facing the image plane side and a positive lens, and a positive meniscus lens having its strong convex surface facing the object side.

106. A rear focus type zoom lens according to claim 91, wherein said first lens unit has a cemented lens, and the Abbe number of a positive lens of said cemented lens is 65 or greater.

107. An optical apparatus comprising a rear focus type zoom lens according to claim 91.

* * * * *

UNITED STATES PATENT AND TRADEMARK OFFICE
CERTIFICATE OF CORRECTION

PATENT NO.      : 6,392,817 B1
DATED           : May 21, 2002
INVENTOR(S)     : Akihisa Horiuchi It is certified that error appears in the above-identified patent and that said Letters Patent is hereby corrected as shown below:

Column 10,
Line 63, "RS" should read -- R5 --.

Column 13,
Line 45, "comprising by" should read -- comprising --.

Signed and Sealed this

Fourteenth Day of January, 2003

JAMES E. ROGAN
*Director of the United States Patent and Trademark Office*